United States Patent
Hiraguchi et al.

(10) Patent No.: US 7,131,607 B2
(45) Date of Patent: Nov. 7, 2006

(54) RECORDING TAPE CARTRIDGE

(75) Inventors: Kazuo Hiraguchi, Kanagawa (JP); Kiyoo Morita, Kanagawa (JP)

(73) Assignee: Fuji Photo Film, Co., Ltd., Kanagawa (JP)

( * ) Notice: Subject to any disclaimer, the term of this patent is extended or adjusted under 35 U.S.C. 154(b) by 0 days.

(21) Appl. No.: 10/636,669

(22) Filed: Aug. 8, 2003

(65) Prior Publication Data

US 2004/0026550 A1    Feb. 12, 2004

Related U.S. Application Data

(62) Division of application No. 10/180,305, filed on Jun. 27, 2002, now Pat. No. 6,736,345.

(30) Foreign Application Priority Data

| Jun. 28, 2001 | (JP) | 2001-196435 |
| Jun. 28, 2001 | (JP) | 2001-196943 |
| Jun. 28, 2001 | (JP) | 2001-196944 |
| Jul. 12, 2001 | (JP) | 2001-212062 |
| Sep. 28, 2001 | (JP) | 2001-302878 |

(51) Int. Cl.
    *G03B 23/02* (2006.01)

(52) U.S. Cl. .................. 242/343.2; 242/338.1; 242/348; 360/132

(58) Field of Classification Search .............. 242/348, 242/348.2, 332.4, 338, 338.1, 343, 343.1, 242/343.2; 360/132
See application file for complete search history.

(56) References Cited

U.S. PATENT DOCUMENTS

| 5,031,065 | A | * | 7/1991 | Flor et al. ................. 242/348 |
| 5,072,325 | A | * | 12/1991 | Weeks et al. ............... 360/132 |
| 5,492,284 | A | * | 2/1996 | Sorensen ................ 242/348.2 |
| 5,883,771 | A | * | 3/1999 | Hoerger ..................... 360/132 |
| 6,034,850 | A | * | 3/2000 | Del Genio et al. ......... 360/132 |
| 6,257,519 | B1 | | 7/2001 | Willems et al. |
| 6,271,991 | B1 | * | 8/2001 | Saliba et al. ................ 360/132 |
| 6,315,230 | B1 | * | 11/2001 | Hansen et al. ............... 242/348 |
| 6,433,962 | B1 | * | 8/2002 | Solomon et al. ............ 360/132 |
| 6,450,432 | B1 | * | 9/2002 | Kaneda et al. ........... 242/332.4 |
| 6,490,133 | B1 | * | 12/2002 | Okamura et al. ........... 360/132 |
| 6,502,776 | B1 | * | 1/2003 | Sogabe et al. ........... 242/332.4 |
| 6,739,537 | B1 | * | 5/2004 | Mizutani et al. ......... 242/332.4 |

FOREIGN PATENT DOCUMENTS

JP          10-188520        *   7/1998

* cited by examiner

*Primary Examiner*—William A. Rivera
(74) *Attorney, Agent, or Firm*—Sughrue Mion, PLLC

(57) ABSTRACT

A metal plate of a recording tape cartridge is provided with a tapered portion at an outer circumference thereof. In a state in which the metal plate is attached at a fixed-side mold plate of a metal mold for molding a reel hub and a lower flange, a gap is formed between the tapered portion and the fixed-side mold plate. During molding, molding material flows into the gap. Because of this gap, an annular pawl portion is formed at the reel hub, which annular pawl portion integrally joins the metal plate with the reel hub by sandwiching the metal plate via the tapered portion.

4 Claims, 31 Drawing Sheets

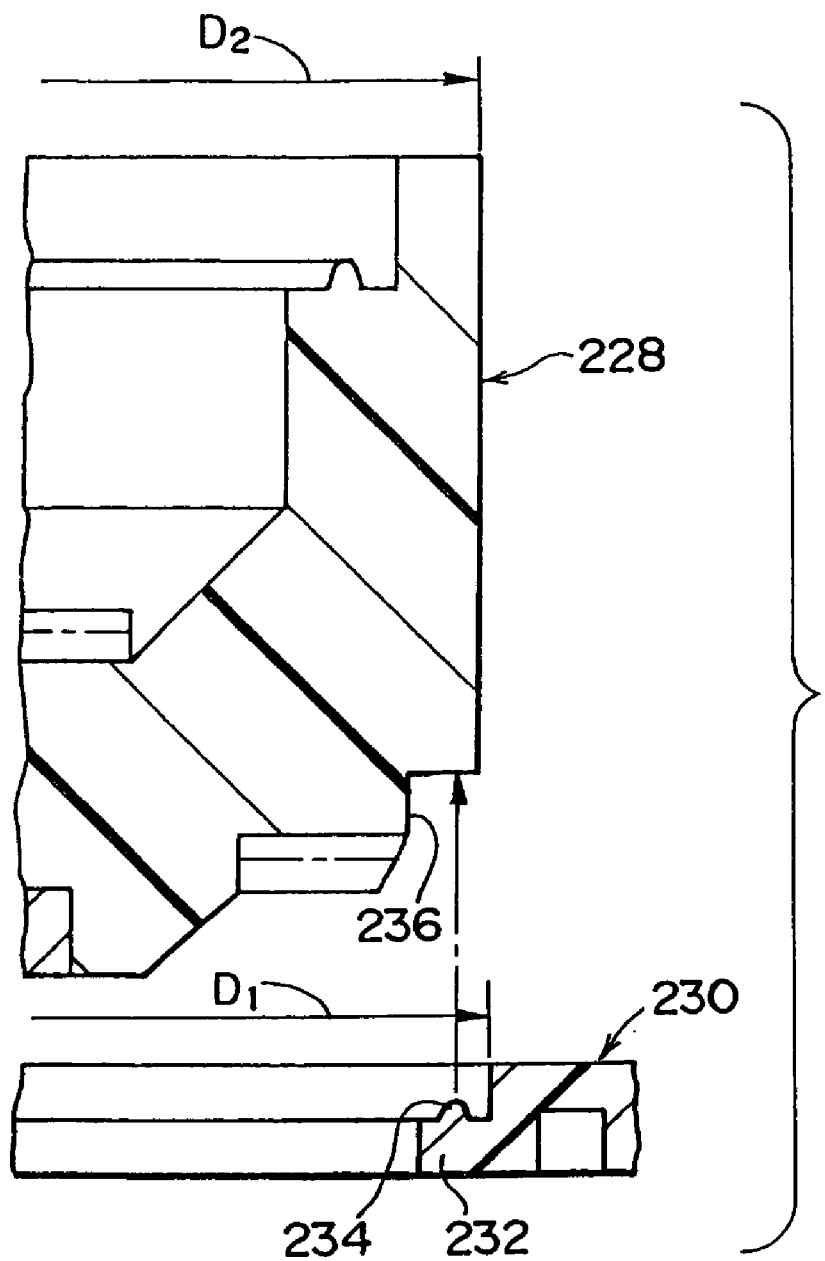

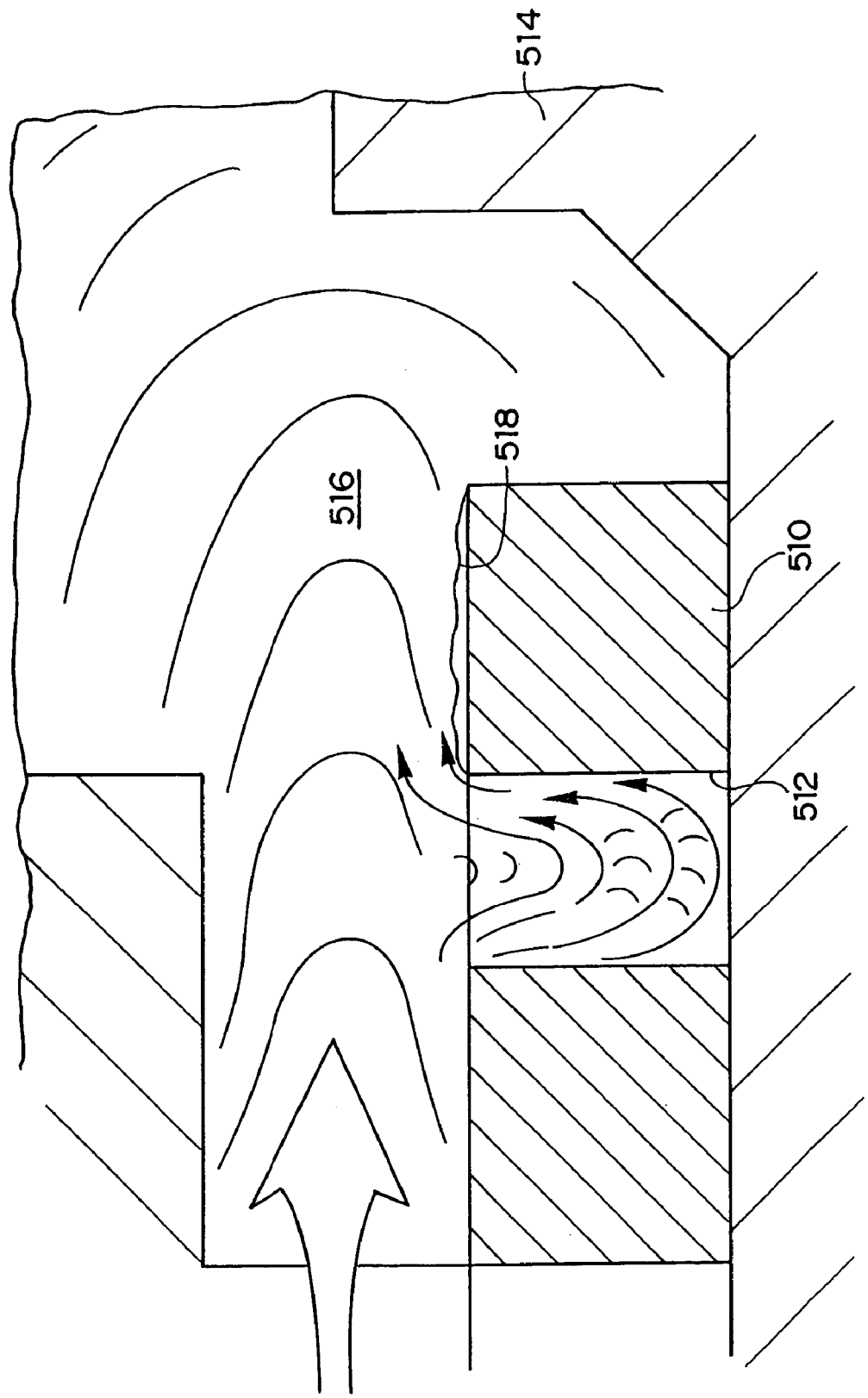

RECORDING TAPE CARTRIDGE

This is a divisional of application Ser. No. 10/180,305 filed Jun. 27, 2002; now U.S. Pat. No. 6,736,345 the disclosure of which is incorporated herein by reference.

BACKGROUND OF THE INVENTION

1. Field of the Invention

The present invention relates to a recording tape cartridge for rotatably accommodating a reel on which a recording tape is wound.

2. Description of the Related Art

In a conventionally known type of recording tape cartridge for a recording medium for use as an external storage device of a computer or the like, a single reel, on which a recording tape such as a magnetic tape is wound, is rotatably accommodated in the recording tape cartridge.

A magnetic tape is used, for example, for storing computer data. The tape cartridge is structured so as to prevent the magnetic tape, which may contain important information, from jamming or the like, and from being unwound unintentionally when not in use, such as during storage or the like.

The reel comprises a reel hub and upper and lower flanges, which are disposed at both ends of the reel hub. As shown in FIG. 29, a reel hub 500 and a lower flange 502 are integrally molded and, after the molding, an upper flange 504 is welded to the reel hub 500 to form a reel 506.

A magnetic tape can be wound on the reel hub 500, and width-directional end portions of the wound-on magnetic tape are retained by the upper and lower flanges 504 and 502.

As shown in FIGS. 29 and 30, the reel hub 500 is provided with a driven gear 508, which meshes with a driving gear for transmitting driving force from a drive-side driving device (not shown).

At an inner side of the driven gear 508 is disposed a metal plate 510 for magnetic attachment. The metal plate 510 is magnetically attracted by a magnet disposed at the drive-side driving device, thus preventing misalignment of the axis and keeping the meshing state of the driven gear 508 and the driving gear. However, because the reel hub 500 is provided with the driven gear 508, the metal plate 510, and the like, variations of pressure during the molding may affect the lower flange 502 molded integrally with the reel hub 500, reducing flatness of the lower flange 502, and this may be a cause of surface-runout in the drive. Further, because the flatness of the lower flange 502 is lowered, roundness of the reel hub 500 deteriorates.

The metal plate 510 is integrally molded with the reel hub 500 and the lower flange 502 inside a metal mold which molds the reel hub 500 and the lower flange 502. Three through-holes 512 for joining the metal plate 510 to the reel hub 500 are formed at regular intervals in the metal plate 510 on a concentric circle thereof. During molding, a molding material flows into the through-holes 512 to fix the metal plate 510 to the reel hub 500.

In the metal mold, a position corresponding to an inner circumferential portion of the reel hub 500 is a gate position. When the reel hub 500 and the lower flange 502 are molded, the molding material flows in a space defined by the metal mold from the position corresponding to the inner circumferential portion of the reel hub 500 towards positions corresponding to a distal portion of the reel hub 500, and in radial directions towards positions corresponding to an outer circumferential portion of the lower flange 502.

When the molding material flows into the through-holes 512 formed in the metal plate 510, air in the through-holes 512 causes friction that resists the molding material. Therefore, comparing with a case in which the molding material flows around the metal plate 510, the pressure is increased. This causes variations in the pressure in a cavity 516, and disturbs stress balance.

Because the stress balance is disturbed when the molding material is filled, the disturbed stress balance is manifested as residual stress after the molding, and causes deformation of the reel hub 500 and the lower flange 502 shown in FIG. 29. Therefore, there is a risk of lowering the accuracy of the reel hub 500 and the driven gear 508, and the flatness of the lower flange 502.

Further, as shown in FIG. 31, because within the through-hole 512 (shown by arrows) moves during hardening of the molding material, wrinkles 518 are produced. Particularly, if the wrinkles 518 produce differences in the level of the outer circumferential surface of the reel hub 500 (see FIG. 29), a winding state of the magnetic tape on the reel may be disturbed, and magnetic surfaces at the inner and outer circumferential sides of the magnetic tape may be scratched by the tape's edges.

SUMMARY OF THE INVENTION

In view of the aforementioned, an object of the present invention is to provide a recording tape cartridge comprising a highly accurate reel including highly flat flanges. Further, there is a demand for improving breaking power of the reel.

In a first aspect of the present invention, a single reel, on which a recording tape is wound, is rotatably accommodated in a recording tape cartridge. The reel includes a hollow hub on which the recording tape is wound. Annular flanges are disposed at both ends of the hub for holding width-directional ends of the recording tape wound on the hub. Also, a metal plate is inserted at one end of the hub.

The hub is formed such that cross-sections taken radially from an axis thereof are the same as each other. This makes flowing states of a molding material the same for the respective cross-sectional directions. Therefore, the flowing state of the molding material does not differ with circumferential position.

In the first aspect of the present invention, an annular joining device that joins to an outer circumference of the metal plate may be provided at the hub. By joining the outer circumference of the metal plate inserted at the end of the hub using the annular joining device, cross-sections of the hub, taken radially from the axis thereof, can be made the same as each other.

Further, since there is no need to provide a hole or the like in the metal plate, variations in the pressure of the molding material flowing over the metal plate are small. Therefore, residual stress can be reduced, thereby improving accuracy of the hub and flatness of the flange.

Furthermore, by joining the metal plate firmly at the outer circumference thereof, the internal dimensions of a portion for joining the metal plate is increased compared with the case in which the metal plate is provided with holes. This means air is easier to remove and less likely to stay. Thus, no wrinkles are created on the hub and the flange.

In the first aspect of the present invention, the joining device may include a joining portion provided at the end of the hub. The joining portion surrounds an annular joined portion extending from an entire outer circumference of the metal plate, and joins the same.

In the present invention, the joining portion may be an annular pawl portion that holds the joined portion. By provision of the pawl portion, the metal plate is prevented from coming off.

In the present invention, the joined portion may join by projecting toward a side away from the pawl portion and meshing with the hub. Thus, the metal plate is firmly fixed to the hub.

In the present invention, an annular fitting portion can be provided in a metal mold for molding the hub, and an annular fitting portion, which fits to the fitting portion of the mold can be formed at the metal plate. Thus, the metal plate is assuredly fixed in the metal mold.

In a second aspect of the present invention, a recording tape cartridge rotatably accommodates a reel on which a recording tape is wound, and the reel includes a hollow hub on which the recording tape is wound. Flanges are welded at both ends of the hub, and the flanges retain the width-directional ends of the recording tape that is wound on the hub.

Specifically, the hub and the flanges are separately molded, and the flanges are then welded at the both ends of the hub to form the reel. Separately molding the hub and the flanges allows selection of a suitable gating system, for example disc gates, and setting of optimal molding conditions for each shape.

Therefore, compared with the case in which the hub and the flange are integrally molded, variations in pressure of the hub can be reduced and flatness of the flanges can be improved. Further, roundness of the hub can be improved by the improvement in the flatness of the flange.

Moreover, by welding the hub and the flange, they can be united with greater certainty and less backlash compared with the case in which a flange and hub are provided with pawl portions for fitting to each other, and can be united more simply compared with the case in which a flange and hub are threaded and screwed together.

In the second aspect of the present invention, a first weld boss may be provided projecting from a welding surface, for welding to the flange, along a circumferential direction of a collar provided at an outer circumferential surface of the hub. A second weld boss may be provided projecting from another welding surface, for welding to the other flange, along a circumferential direction of a stepped portion provided at an inner circumferential surface of the hub.

By providing the first weld boss and the second weld boss projecting from the welding surfaces, the weld bosses can be fused to weld the flanges to the hub when frictional heat is generated between the flanges and the hub by vibrational energy from an ultrasonic welder. Therefore, compared with the case in which no weld boss is provided, the flanges and hub can be welded together more firmly.

In the second aspect of the present invention, a gap may be formed between the outer circumferential surface of the collar and the hub and an inner circumferential surface of the flange, so that residue of the first weld boss can run into the gap. According to the second aspect of the present invention, when two members are to be welded, one of the welding surfaces is provided with a projecting weld boss, and the weld boss is fused for welding. By forming the gap between the inner circumferential surface of the flange and the outer circumferential surface of the collar of the hub, and allowing the residue from the welding surface to run into the gap, the residue of the welding can be prevented from running over onto the surface of the flange.

In the second aspect of the present invention, a gap may be formed between a wall surface of the stepped portion and an outer circumferential surface of a boss provided at an inner circumferential portion of the flange, so that residue of the second weld boss can run into this gap.

In the second aspect of the present invention, instead of the first weld boss, a third weld boss may be provided at a stepped portion cut into the outer circumferential surface of the hub, and an upper surface of the flange may make surface contact with a ceiling portion of this stepped portion. In this structure, a gap is formed between a wall surface of the stepped portion and an inner circumferential surface of the flange, so that residue of the third weld boss can run into this gap. Thus, edges of the recording tape can be prevented from coming into the gap.

In a third aspect of the present invention, a recording tape cartridge rotatably accommodates a reel on which a recording tape is wound. The reel includes a core. An annular lower flange is integrally molded with the core and positioned at one end side of the core.

Outside the core, a cylindrical hub, on which the recording tape is wound, is disposed and fixed at the lower flange. Further, an upper flange is fixed at the other end side of the core, and the upper flange and lower flange held width-directional ends of the recording tape wound on the hub.

By disposing the hub outside the core and winding the recording tape on the hub, even if the core becomes inclined due to thermal contraction after the molding of the core and the lower flange, the inclination of the core does not affect winding of the recording tape, and a highly accurate hub can be obtained.

In the third aspect of the present invention, the hub may include a sleeve attached at an annular depression formed in the lower flange on a concentric circle thereof. During thermal contraction after molding, the thermal contraction is effected along radial directions of the core and the lower flange. Therefore, the annular depression follows the thermal contraction of the core and the lower flange. By providing the annular depression on a concentric circle of the lower flange, and fitting the sleeve in the annular depression, the axis of the sleeve is aligned with axes of the core and the lower flange. Therefore, the axis of the sleeve does not deviate with respect to the lower flange.

In the third aspect of the present invention, a small diameter portion may be provided at one end side of the sleeve, and the small diameter portion may be attached to the annular depression. In this structure, a shoulder portion between the small diameter portion and a large diameter portion abuts on the lower flange. Therefore, even if there is a gap formed between the small diameter portion and the annular depression, the recording tape will not come into the gap.

In the third aspect of the present invention, the sleeve of the hub is inserted in a metal mold for molding the core and the lower flange. Thus, labor for attaching the sleeve after the molding of the core and the lower flange can be saved. Therefore, production steps can be reduced, thereby reducing production costs.

In the third aspect of the present invention, a metal sleeve may be used. Since metals have a lower coefficient of linear expansion than synthetic resins, use of the metal sleeve provides a highly accurate hub.

In the third aspect of the present invention, engaging portions for engaging with the upper flange and the lower flange may be provided at the sleeve at an inner circumferential surface side thereof. In this structure, the recording tape is wound only on the sleeve. Therefore, even if size is irregular at engaged portions of the upper flange and the lower flange which engage with the sleeve, this irregularity does not affect the winding of the recording tape.

In a fourth aspect of the present invention, the reel includes a hollow hub on which recording tape is wound, and annular flanges are disposed at both ends of the hub for holding the width-directional ends of the recording tape wound on the hub. A reel rotation gear is disposed at one end of the hub, and a plate is disposed inside the reel rotation gear, which plate can be attracted by a magnet disposed at a drive for writing/reading information on/from the recording tape.

A braking gear is provided at an outer circumference of one flange, and the braking gear can engage with a braking member disposed in a case that accommodates the reel. By providing the braking gear at the outer circumference of the flange to effect braking, unintended rotation of the reel when the recording tape cartridge is not in use can naturally be prevented with certainty. Further, compared with a case in which the braking gear is provided at a core side of the flange, required braking force is smaller and pitch of the braking gear can be increased. Therefore, failures such as breakage of the braking gear will not be caused. Moreover, since the braking gear is not provided at the core side of the flange, molding accuracy of the reel can be improved.

In the fourth aspect of the present invention, the braking member is urged by an urging device in a direction in which it engages with the braking gear. At a time when a driving gear, which is disposed at the drive and can mesh with the reel rotation gear, meshes with the reel rotation gear, the braking member is pushed in a direction against the urging device to release engagement between the braking member and the braking gear.

In other words, when the driving gear is not meshed with the reel rotation gear, the braking member urged by the urging device engages with the braking gear to block rotation of the reel. On the other hand, at the same time as the driving gear meshes with the reel rotation gear, the braking member is pushed in the direction against the urging device to release engagement between the braking member and the braking gear. Therefore, driving force from the driving gear can be transmitted to the reel rotation gear to rotate the reel.

In the fourth aspect of the present invention, the pitch of the braking gear may be in a range from 1 mm to 3.5 mm. As a result, the braking gear is not easily broken.

BRIEF DESCRIPTION OF THE DRAWINGS

FIG. 16 is an enlarged view of a hub and a lower flange of the modification of the reel included in the recording tape cartridge according to the second embodiment of the present invention.

FIG. 31 is a sectional view showing a state of a molding material flowing in the metal mold for molding the reel hub and lower flange of the conventional reel.

DESCRIPTION OF THE PREFERRED EMBODIMENTS

A recording tape cartridge according to a first embodiment of the present invention will now be described. It should be noted that, for convenience of explanation, a direction in which the recording tape cartridge is mounted into a drive is referred to as a forward direction, and expressions such as front, back, right, left, upper and lower are based on this direction. Further, the recording tape used is a magnetic tape, and the following description is made with respect to a magnetic tape cartridge.

First, an outline of the magnetic tape cartridge according to the first embodiment of the present invention is described.

Figure 1:
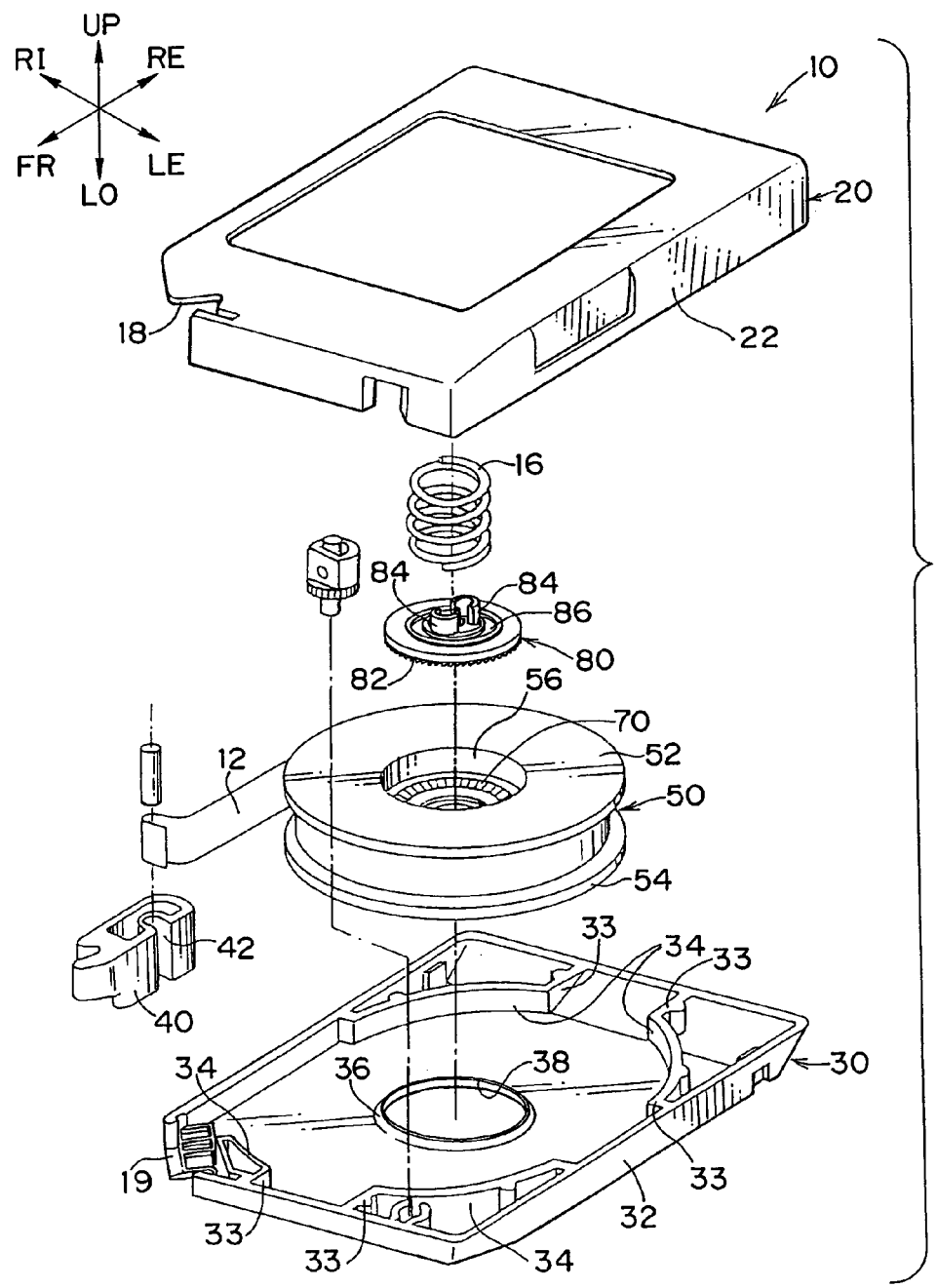
FIG. 1 is an exploded perspective view of a recording tape cartridge according to a first embodiment of the present invention.
Figure 2:
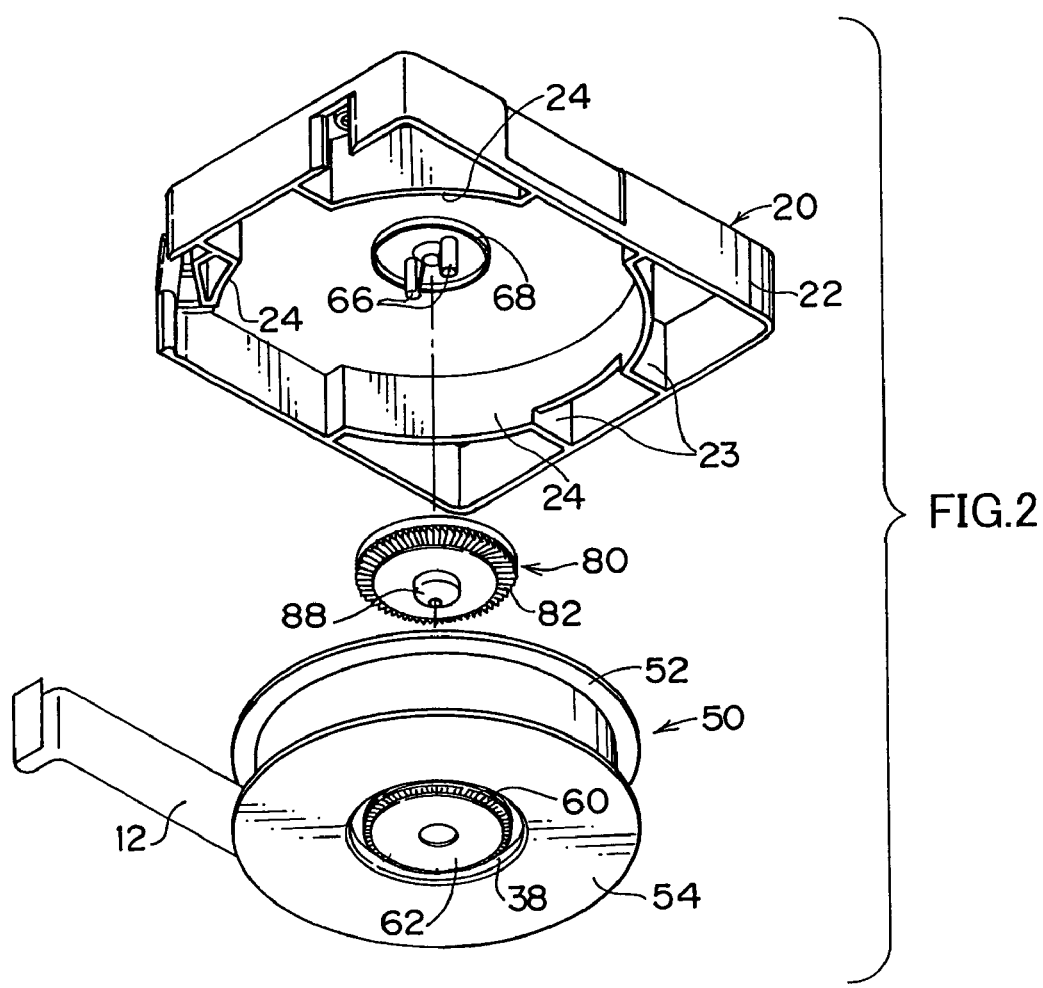
FIG. 2 is an exploded perspective view of the recording tape cartridge according to the first embodiment of the present invention viewed from below.
Figure 3:
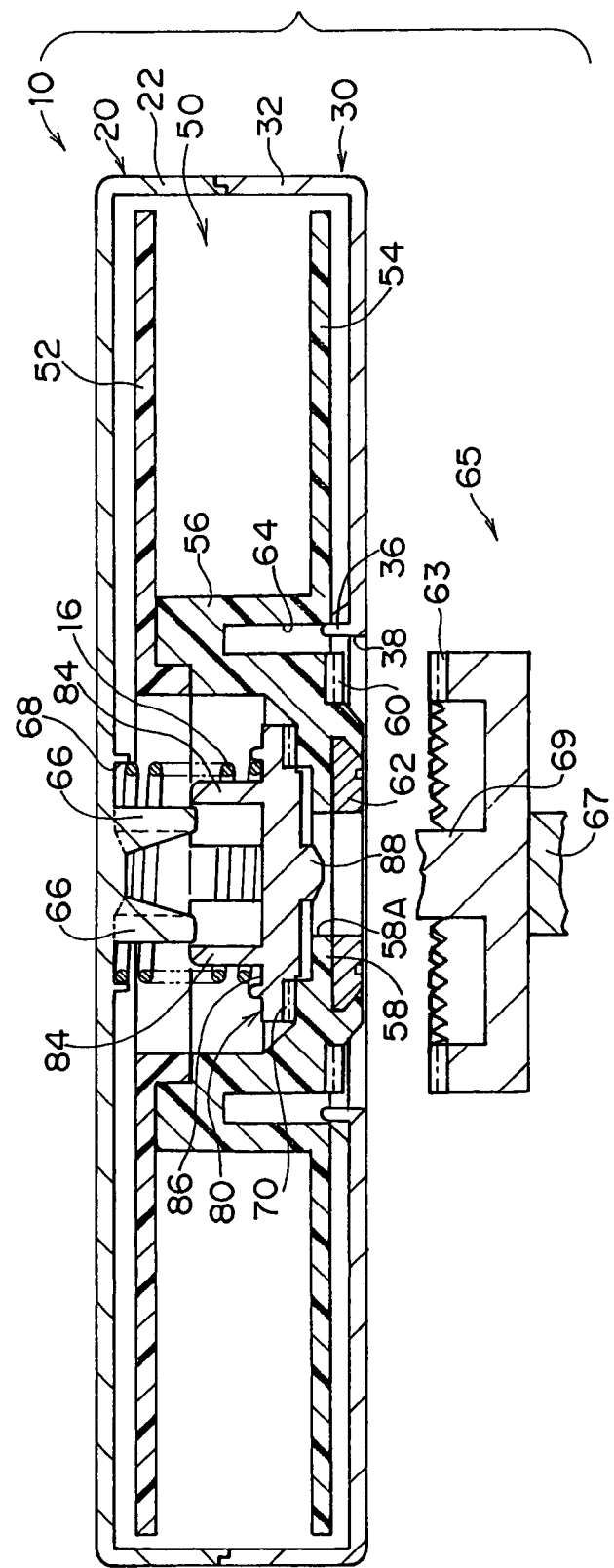
FIG. 3 is a sectional view of the recording tape cartridge according to the first embodiment of the present invention and a drive-side driving device.

As shown in FIGS. 1–3, a magnetic tape cartridge 10 comprises an upper case 20 and a lower case 30, which are made of synthetic resin and formed in a substantially rectangular box shape. A peripheral wall 22 of the upper case 20 and a peripheral wall 32 of the lower case 30 are welded together by ultrasonic welding or the like.

Substantially cylindrical walls 24 and 34 are formed standing respectively from inner surfaces of the upper case 20 and the lower case 30. Internal diameters of the cylindrical walls 24 and 34 are slightly larger than external diameters of an upper flange 52 and a lower flange 54 of a reel 50, and the reel 50 is rotatably accommodated in the cylindrical walls 24 and 34.

Ribs 23 are provided between the cylindrical wall 24 and the peripheral wall 22 of the upper case 20, and ribs 33 are provided between the cylindrical wall 34 and the peripheral wall 32 of the lower case 30. The ribs 23 and 33 respectively connect the cylindrical wall 24 to the peripheral wall 22, and the cylindrical wall 34 to the peripheral wall 32, thereby reinforcing the cylindrical walls 24 and 34.

The reel 50 comprises a cylindrical reel hub 56, and the upper flange 52 and lower flange 54 disposed at both ends of the reel hub 56. The upper flange 52 and the lower flange 54 retain width-directional edges of a magnetic tape 12, which is a medium for writing and reading information, wound around the reel hub 56.

A bottom wall 58 including a hole 58A formed in the center thereof is provided at the lower flange 54 side of the reel hub 56. An annular reel gear 60 (driven gear) is formed at a lower surface side of the bottom wall 58 projecting from the bottom wall 58.

The reel gear 60 can be exposed through a circular opening 38 provided in the center of the lower case 30 so as to mesh with a driving gear 63 provided at a drive 65 and transmit rotational force to the reel 50.

An annular metal plate 62 is integrally molded at an inner side of the reel gear 60. The metal plate 60 is attracted by a magnet (not shown) disposed at the drive 65 in order to prevent axial misalignment, and thus maintain the meshing state of the reel gear 60 with the driving gear 63.

An annular groove 64 is provided outside the reel gear 60. A rib 36, which is provided standing from a peripheral portion of the opening 38 provided in the lower case 30, is inserted in the annular groove 64 so that the reel 50 is positioned with respect to the lower case 30.

Further, an annular reel gear 70 is formed at an upper surface side of the bottom wall 58 of the reel hub 56. The reel gear 70 can mesh with a braking gear 82 provided at a lower surface outer circumferential portion of a substantially disk-shaped braking member 80, which can be accommodated in the reel hub 56.

Substantially U shaped (when viewed from above) ribs 84 (hereinafter referred to as "U-rib") are provided standing up from the braking member 80. Also, a pair of locking pins 66, which can engage with the U-rib 84, is suspended from the center of the inner surface of the upper case 20.

Thus, the braking member 80 can move within the reel hub 56 and the U-rib 84 of the braking member 80 can move along the locking pins 66, and rotation of the braking member 80 is blocked. Therefore, when the magnetic tape cartridge 10 is not in use, the braking gear 82 of the braking member 80 is meshed with the reel gear 70 to prevent rotation of the reel 50.

Further, an annular groove 86 is provided at the braking member 80 outside the U-rib 84. Also, an annular projection 68 is provided at the upper case 20 outside the locking pins 66. The annular projection 68 and the annular groove 86 hold a spring 16, which is mounted between the braking member 80 and the upper case 20.

Thus, the braking member 80 is urged toward the reel gear 70 so that the braking gear 82 firmly meshes with the reel gear 70, thereby assuredly preventing unintended rotation of the reel 50.

A substantially cylindrical projection 88, which can be inserted into a hole 58A, is provided at the center of a lower surface of the braking member 80. Before the reel gear 60 meshes with the driving gear 63 to transmit rotational force to the reel 50, a mesh-release pin 69, which is provided at a tip of a rotating shaft 67 of the drive 65, abuts the projection 88 to push up the braking member 80 in a direction against urging force of the spring 16, thereby releasing meshing between the braking gear 82 and the reel gear 60. Thus, rotation of the reel 50 is permitted.

As shown in FIG. 1, openings 18 and 19 are formed respectively at front-left corners of the peripheral wall 22 of the upper case 20 and that of the peripheral wall 32 of the lower case 30. The openings 18 and 19 are provided such that the magnetic tape 12 wound around the reel 50 can be drawn out.

A leader block 40 is attached at an end of the magnetic tape 12. A pulling pin (not shown) provided at the drive engages with a recess 42 formed in the leader block 40, and the magnetic tape 12 is wound by a winding reel provided at the drive. At this time, the reel 50 and the winding reel are driven to rotate synchronously, and data is written or read while the magnetic tape 12 is sequentially wound onto the winding reel.

On the other hand, when the magnetic tape cartridge 10 is not in use, the leader block 40 is locked at peripheral edges of the openings 18 and 19, and the openings 18 and 19 are closed by the leader block 40.

Next, the reel of the magnetic tape cartridge 10 according to the first embodiment of the present invention is described. It should be noted that explanations of parts that overlap the above description are omitted.

Figure 4:
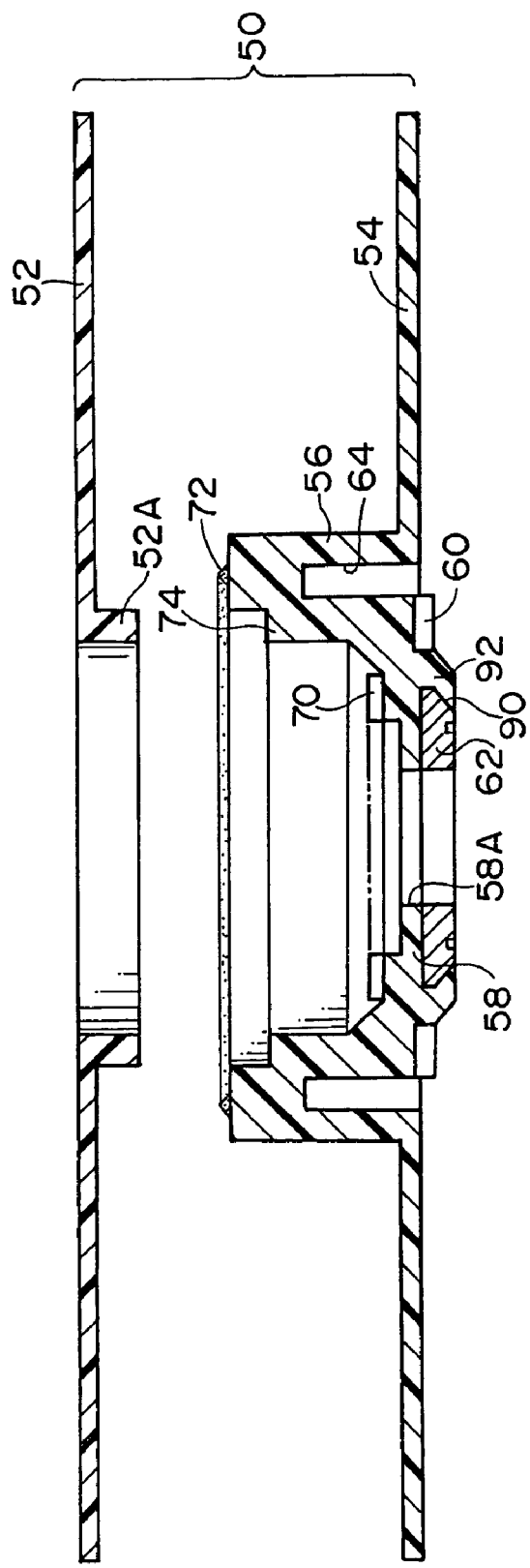
FIG. 4 is an exploded sectional view of a reel included in the recording tape cartridge according to the first embodiment of the present invention.
Figure 5:
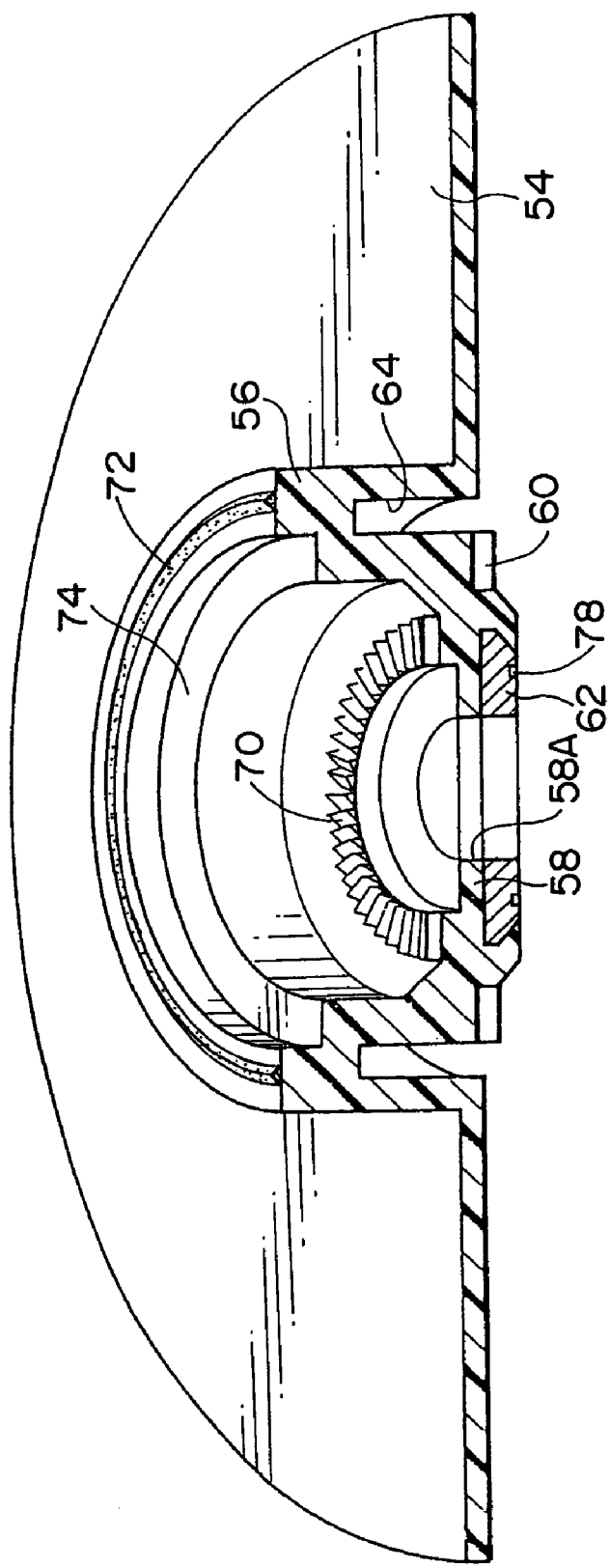
FIG. 5 is a perspective sectional view of a reel hub and a lower flange of the reel included in the recording tape cartridge according to the first embodiment of the present invention, showing a tapered portion of a metal plate and a pawl portion of the lower flange.

As shown in FIGS. 4 and 5, the reel hub 56 and the lower flange 54, which form the reel 50, are integrally molded. A weld boss 72 for ultrasonic welding, which has a substantially triangular cross section, is provided projecting from an end surface of the reel hub 56.

After the reel hub 56 and the lower flange 54 have been molded, the upper flange 52 is placed on top of the weld boss 72, and the weld boss 72 is fused by ultrasonic waves to weld the upper flange 52 to the end surface of the reel hub 56, thereby forming the reel 50.

The reel hub 56 and the upper flange 52 are formed using molding materials which are mutually compatible. Therefore, the reel hub 56 and the upper flange 52 can be welded together using ultrasonic waves. Examples of types of the molding materials include combinations of resins such as PMMA and ABS, AS and ABS, and combinations of polycarbonates.

An inner circumferential surface of the reel hub 56 is provided with a small diameter portion 74 at a position a step lower than the end surface of the reel hub 56. Also, a boss 52A is formed at the upper flange 52. When the upper flange 52 is placed on top of the weld boss 72, the boss 52A engages with the inner circumferential surface of the reel hub 56.

Further, when the upper flange 52 is welded to the end surface of the reel hub 56 by the ultrasonic welding, the end surface of the boss 52A abuts on the end surface of the small diameter portion 74, thereby limiting movement of the upper flange 52 (see FIG. 3).

Thickness of the reel hub 56 is partially increased by the provision of the small diameter portion 74 at the inner circumferential surface of the reel hub 56. However, the annular groove 64 provided in the bottom wall 58 of the reel hub 56 is utilized to reduce the thickness, the thickness of the reel hub 56 is made as even as possible, and thus sinking of the outer circumferential surface of the reel hub 56 can be prevented.

Figure 6:
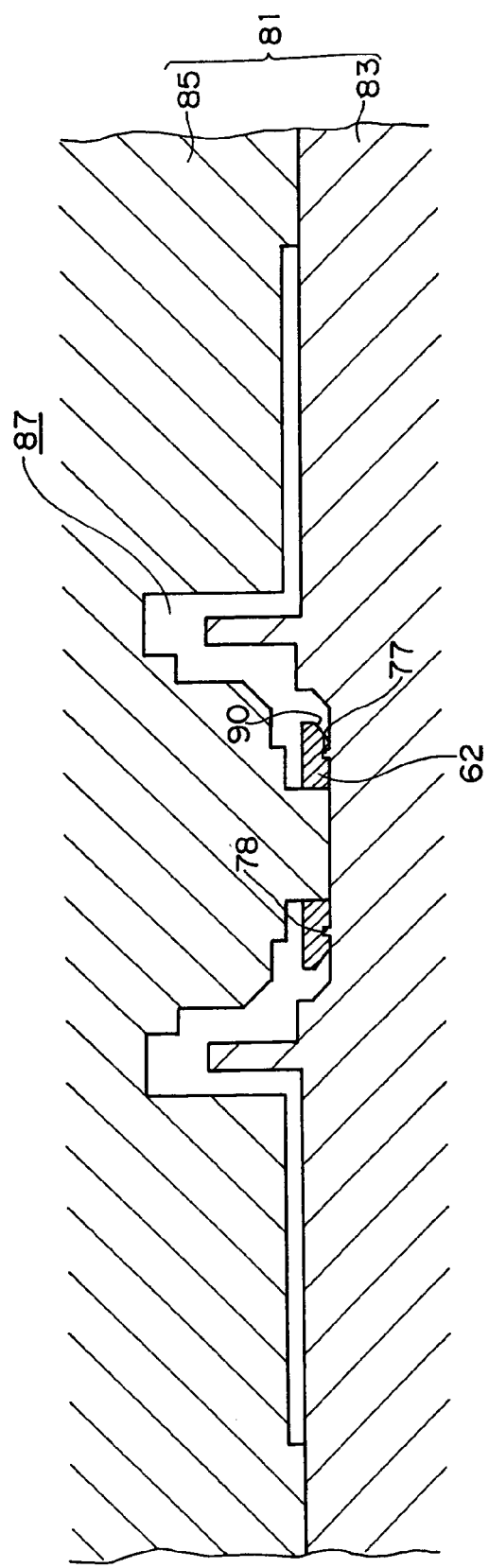
FIG. 6 is a sectional view schematically showing a metal mold for molding the reel hub and the lower flange of the reel included in the recording tape cartridge according to the first embodiment of the present invention.

The metal plate 62 is disposed inside the reel gear 60. The metal plate 62 is integrally molded by being inserted into a metal mold 81 for molding the reel hub 56 and the lower flange 54, shown in FIG. 6.

The metal mold 81 includes a fixed-side mold plate 83 and a movable-side mold plate 85. The molding material is filled into a cavity 87 defined by the fixed-side mold plate 83 and the movable-side mold plate 85 in a state in which the metal plate 62 is fixed to the fixed-side mold plate 83 and the metal mold 81 is clamped.

An annular depression 78 is provided at one side of the metal plate 62. When the metal plate 62 is attached at the fixed-side mold plate 83, an annular protrusion 77 formed at the fixed-side mold plate 83 fits in the annular depression 78, to position and fix the metal plate 62 to the fixed-side mold plate 83.

Further, an annular tapered portion 90 is provided, as a joinable portion, at a peripheral portion of the one end side of the metal plate 62. When the metal plate 62 is attached to the fixed-side mold plate 83, a gap is formed between the tapered portion 90 of the metal plate 62 and the fixed-side mold plate 83. At the time of molding, the molding material flows into this gap.

With this gap, as shown in FIGS. 4 and 5, an annular pawl portion 92, which serves as a joining portion joined to the outer circumference of the metal plate 62, is formed at the reel hub 56. In this manner, by the pawl portion 92 joining to the tapered portion 90 of the metal plate 62, the metal plate 62 is united with the reel hub 56.

Moreover, by providing the annular tapered portion 90 at the peripheral portion of the one end side of the metal plate 62 and joining the tapered portion 90 by the annular pawl portion 92, all cross-sectional forms of the reel hub 56 taken radially from the axis of the reel hub 56 can be made the same as each other. Therefore, flowing states of the molding material do not differ between circumferential direction positions.

Figure 29:
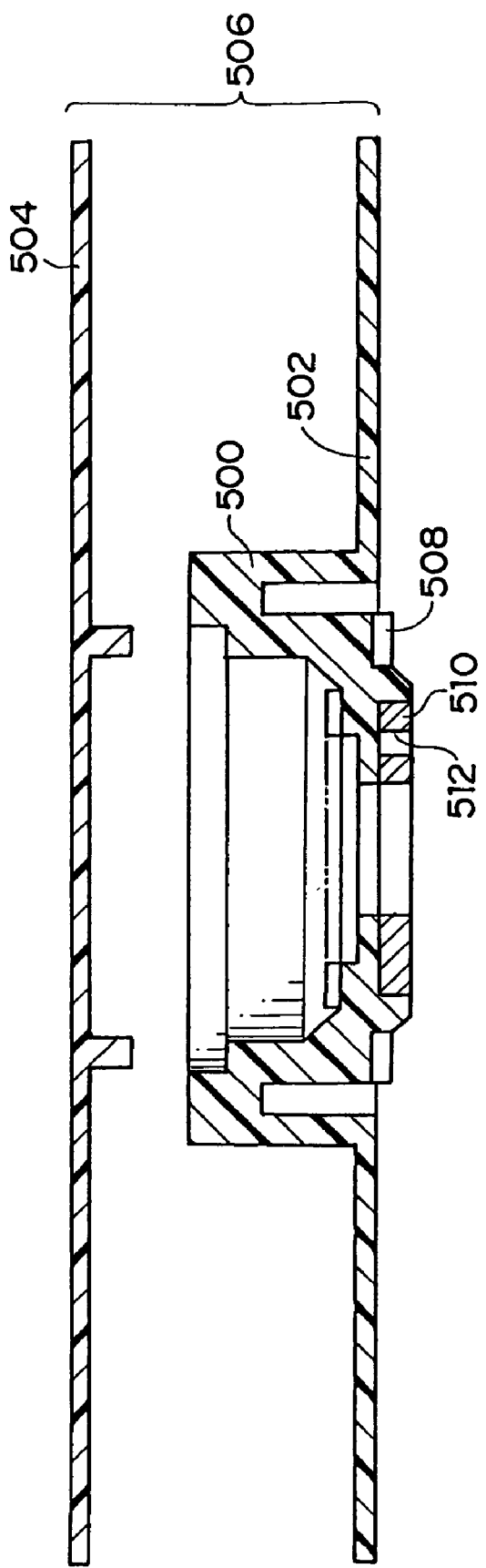
FIG. 29 is an exploded sectional view of a conventional reel.
Figure 30:
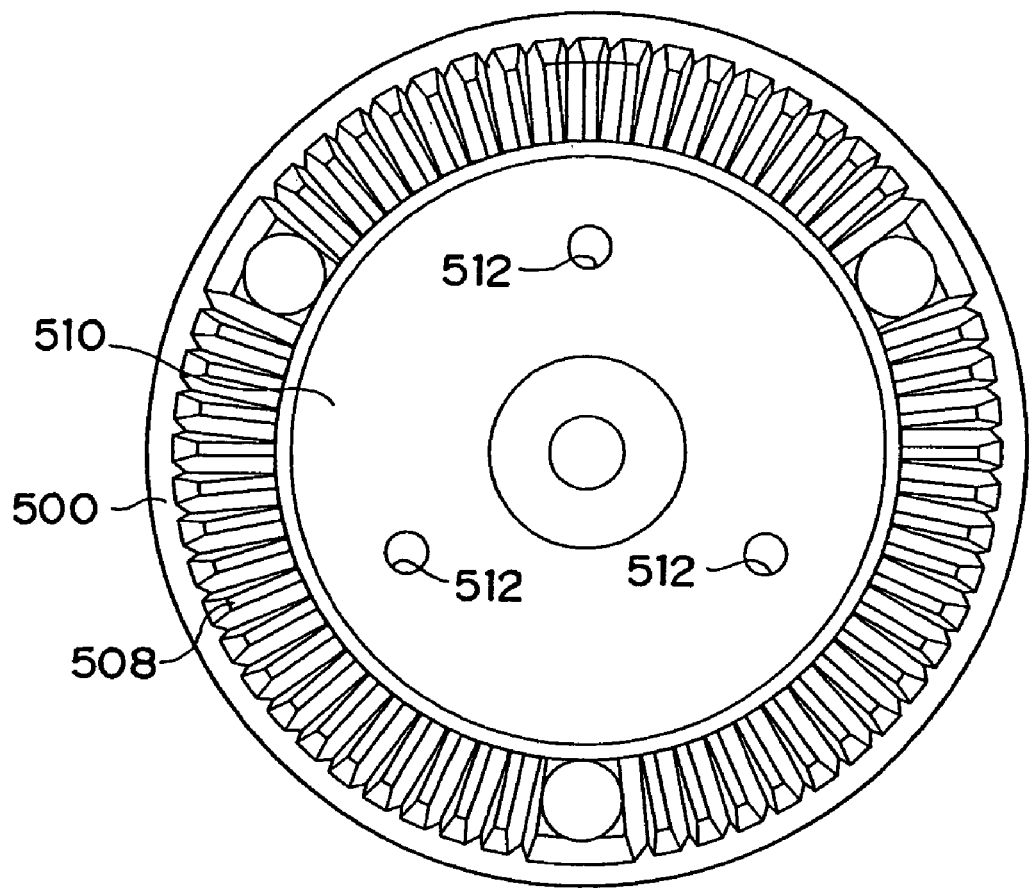
FIG. 30 is a bottom view of a metal plate inserted in a metal mold for molding a reel hub and a lower flange of the conventional reel.

In addition, since there is no need to provide the through-holes 512 in the metal plate 510 (see FIG. 29) as in the conventional technique, variations in the pressure of the molding material flowing over the metal plate 62 are small. Therefore, the residual stress can be reduced, improving accuracy of the reel hub 56 and the reel gear 60. Further, flatness of the lower flange 54 can be improved.

Further, by providing the annular pawl portion 92 for joining the outer circumference of the metal plate 62, internal dimensions of the portion for joining the metal plate 62 are larger than in the case of providing the through-holes 512 in the metal plate 510 (FIG. 31), and air is easier to remove and less likely to be trapped. Thus, no wrinkles are caused on the reel hub 56 and the lower flange 54.

It should be noted that the tapered portion 90 is provided at the metal plate 62 to improve joint condition between the metal plate 62 and the lower flange 54 for integration thereof. However, this is not intended to limit the present invention, what is required is simply that the metal plate 62 is united with the lower flange 54 by insert molding.

Figure 7:
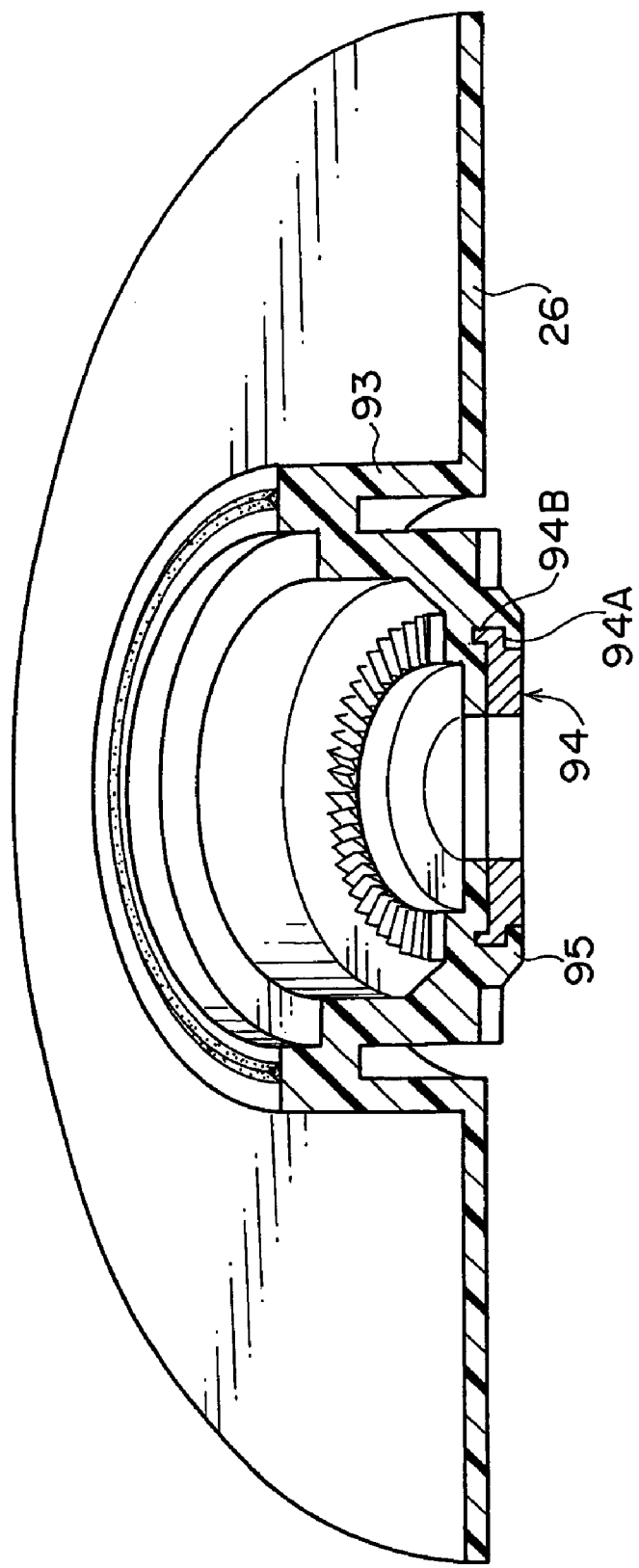
FIG. 7 is a perspective sectional view of the reel hub and the lower flange of the reel included in the recording tape cartridge according to the first embodiment of the present invention, showing a stepped portion and an annular rib of the metal plate and the lower flange.

For example, as shown in FIG. 7, an annular stepped portion 94A, which serves as a joining portion, may be provided at an outer circumferential surface of a metal plate 94 so as to intrude into a reel hub 93. An annular rib 94B may be provided standing from an outer circumferential surface of the metal plate 94 toward a movable-side mold plate of a metal mold (upward in FIG. 7), and the stepped portion 94A and the rib 94B may be joined by an annular pawl portion 95.

Thus, the molding material is poured into a stepped portion defined by the stepped portion 94A and the rib 94B, and joint condition around the rib 94B is improved by increasing contact area with the lower flange 54, thus uniting the metal plate 94 with the lower flange 54.

Figure 8:
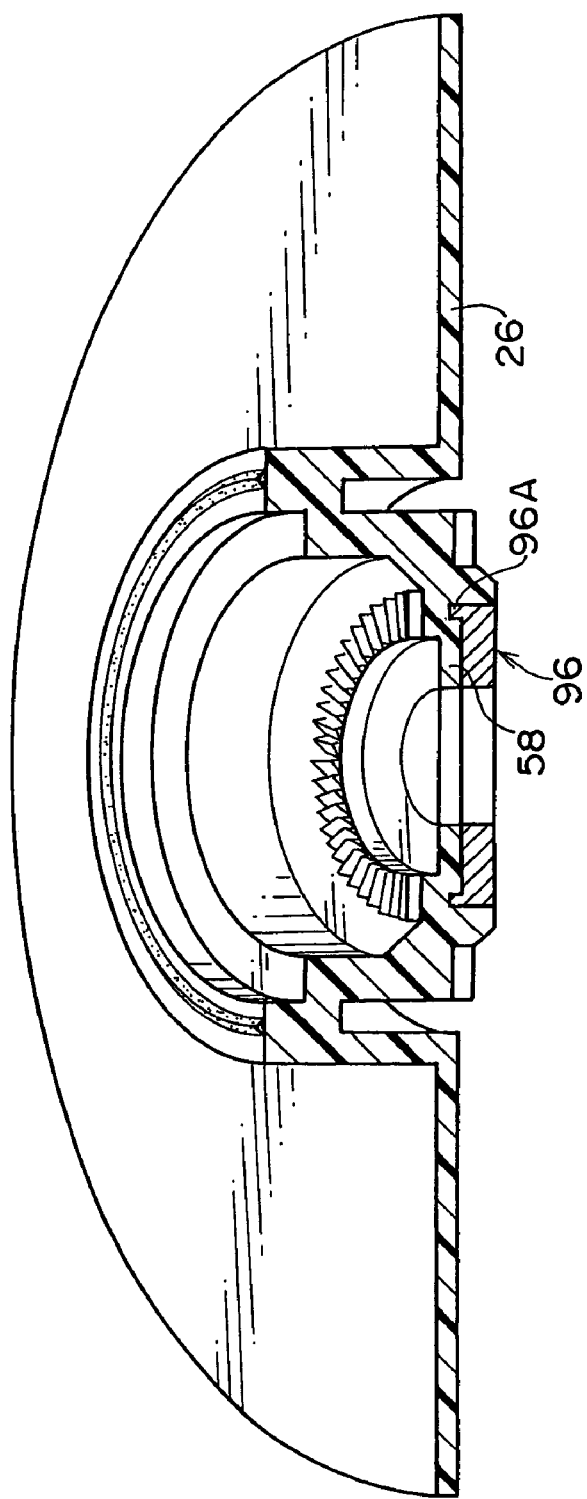
FIG. 8 is a perspective sectional view of the reel hub and the lower flange of the reel included in the recording tape cartridge according to the first embodiment of the present invention, showing the annular rib of the metal plate and the lower flange.

Further, as shown in FIG. 8, simply by providing an annular rib 96A (a joining portion) standing from an outer circumferential surface of a metal plate 96 toward a movable-side mold plate of a metal mold (upward in FIG. 8) to join with the bottom wall 58 joining portion) of the lower flange 54, the metal plate 96 can be joined with the lower flange 54.

Furthermore, although a so-called single reel type, wherein one reel is accommodated in the magnetic tape cartridge, is described here, this is not intended to limit the present invention. A two-reel type, wherein two reels are accommodated in the magnetic tape cartridge, is also applicable.

Next, a reel of a magnetic tape cartridge according to a second embodiment of the present invention is described. It should be noted that details of the magnetic tape cartridge according to the present embodiment are substantially the same as those of the magnetic tape cartridge according to the first embodiment, and therefore explanation thereof is omitted.

Figure 9:
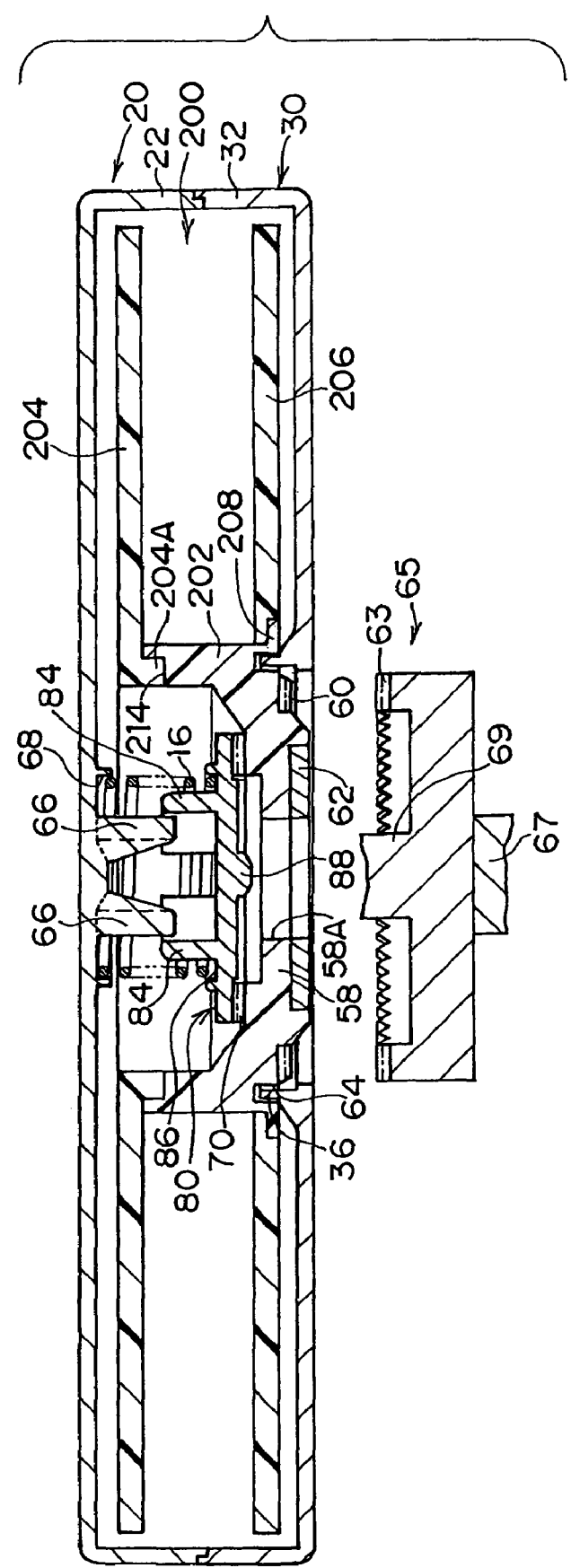
FIG. 9 is a sectional view of a recording tape cartridge according to a second embodiment of the present invention and the drive-side driving device.
Figure 10:
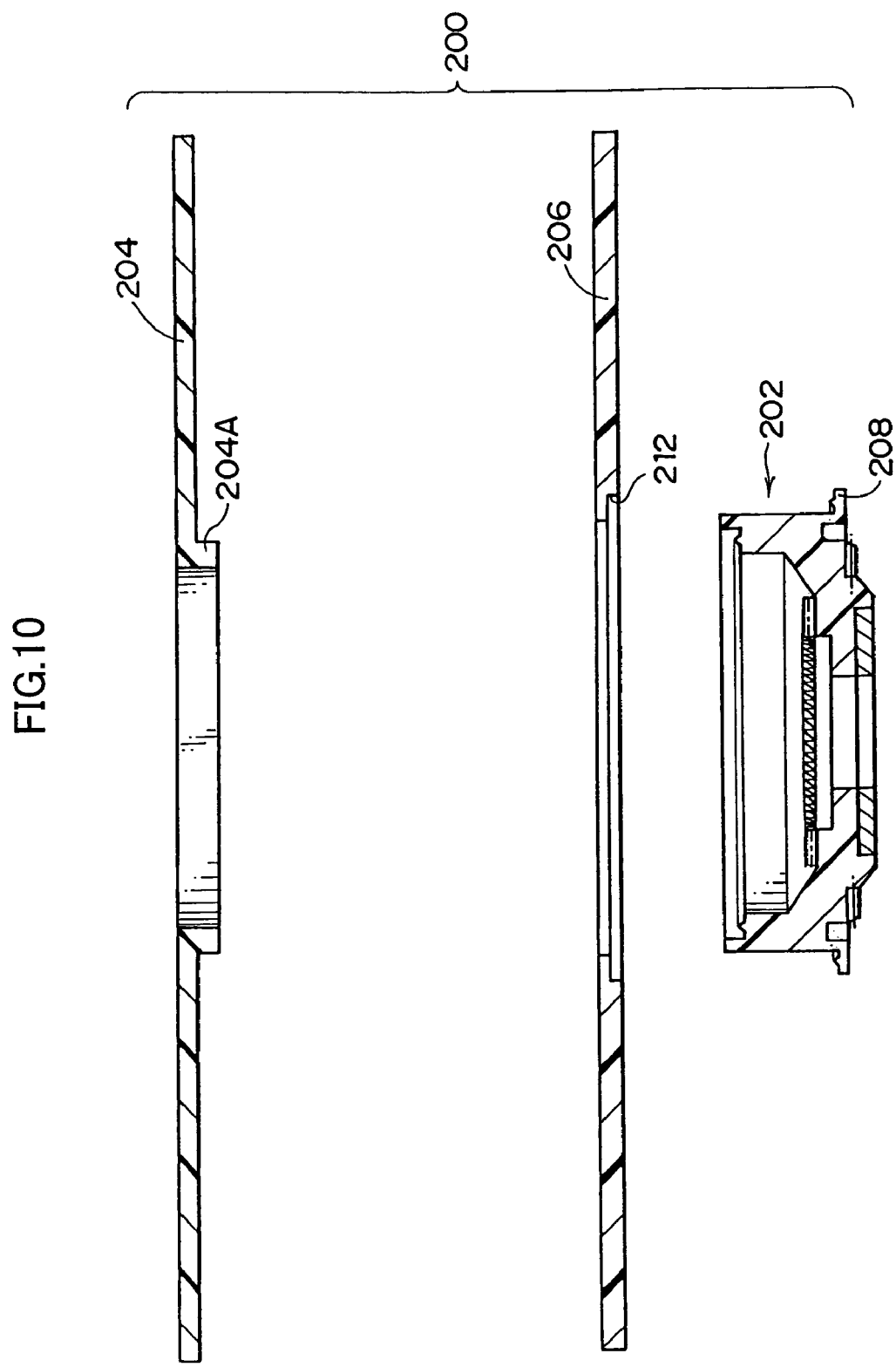
FIG. 10 is an exploded sectional view of a reel included in the recording tape cartridge according to the second embodiment of the present invention.

As shown in FIGS. 9 and 10, a reel hub 202, an upper flange 204 and a lower flange 206 forming a reel 200 are separately molded Additionally, the upper flange 204 and the lower flange 206 may be molded as a set. After the reel hub 202, the upper flange 204 and the lower flange 206 have been molded, the reel hub 202 and the upper flange 204, and the reel hub 202 and the lower flange 206 are welded by ultrasonic welding to form the reel 200.

Figure 11:
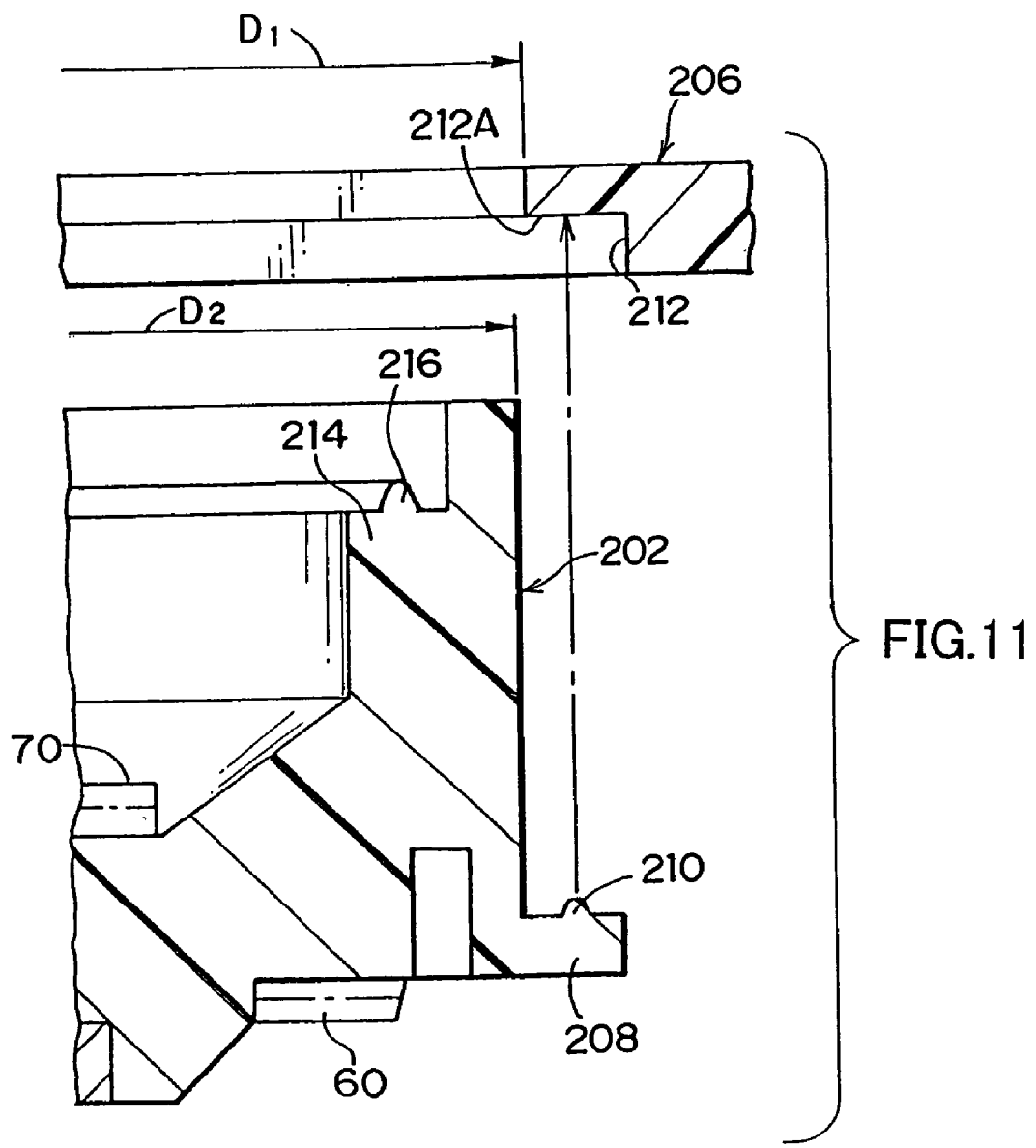
FIG. 11 is an enlarged view of an annular flange provided at a hub and a large diameter portion provided at a lower flange included in the reel included in the recording tape cartridge according to the second embodiment of the present invention.
Figure 12A:
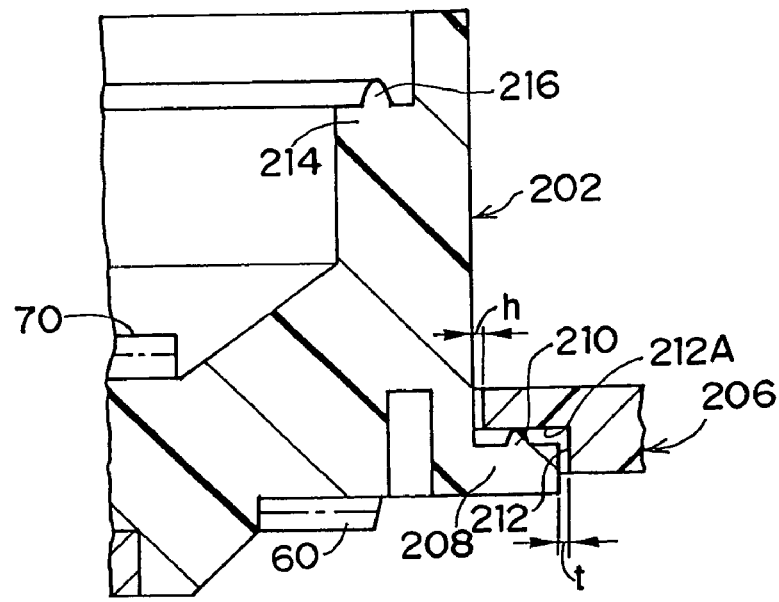
FIG. 12A is an enlarged view of the annular flange provided at the hub and the large diameter portion provided at the lower flange included in the reel included in the recording tape cartridge according to the second embodiment of the present invention, before the lower flange is welded to the hub.

As shown in FIGS. 11 and 12A, a collar 208 extends from a lower edge of an outer circumference of the reel hub 202. On an upper surface of the collar 208, a so-called weld boss 210, which is fused by ultrasonic waves for welding to the lower flange 206, is provided so as to project therefrom. A sectional form of the weld boss 210 is substantially a triangle, so it can be fused easily.

An internal diameter $D_1$ of the lower flange 206 is slightly larger than an external diameter $D_2$ of the reel hub 202, so that a gap h is formed between an outer circumferential surface of the reel hub 202 and an inner circumferential surface of the lower flange 206 when the lower flange 206 is fitted on the reel hub 202.

Further, the lower flange 206 is provided with a large diameter portion 212. An internal diameter of the large diameter portion 212 is slightly larger than an external diameter of the collar 208, so that a gap t is formed between the collar 208 and the large diameter portion 212 when the lower flange 206 is fitted on the reel hub 202.

Because the gaps h and t are formed between the reel hub 202 and the lower flange 206, residue of the fused weld boss 210, which is produced when the reel hub 202 and the lower flange 206 are welded, runs into the gaps h and t.

Figure 12B:
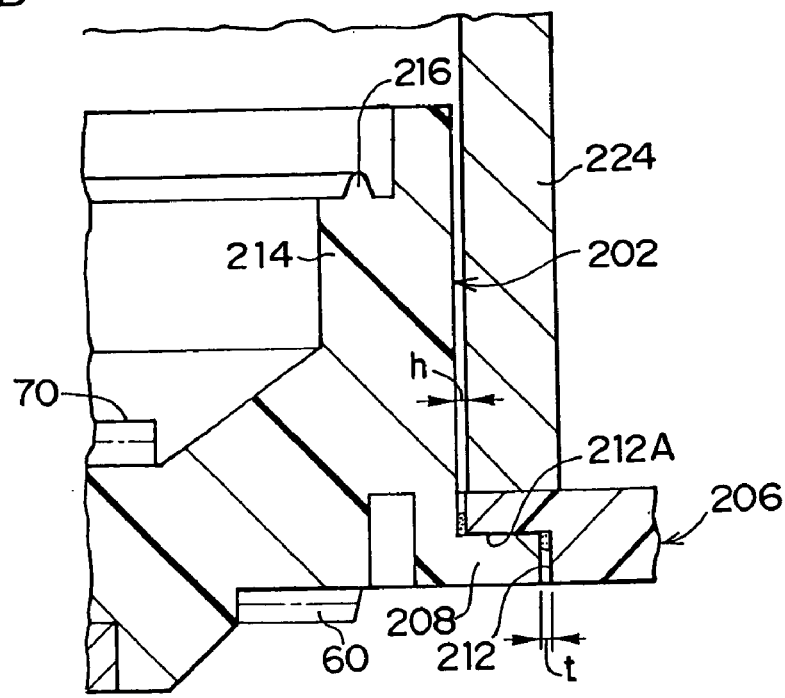
FIG. 12B is an enlarged view of the annular flange provided at the hub and the large diameter portion provided at the lower flange included in the reel included in the recording tape cartridge according to the second embodiment of the present invention, when the lower flange is welded to the hub.

Thus, as shown in FIG. 12B, the residue of the welding material does not overflow onto the surfaces of the reel hub 202 and the lower flange 206. Further, the welding can be effected not only in an axial direction of the reel hub 202, but also in a circumferential direction thereof, thereby providing a good welding stability.

Figure 13A:
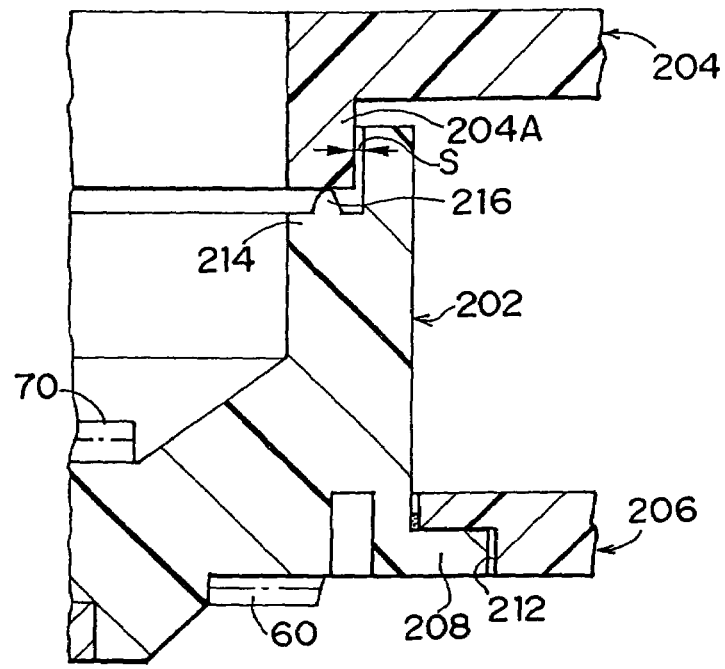
FIG. 13A is an enlarged view of a small diameter portion provided at the hub and a boss provided at an upper flange included in the reel included in the recording tape cartridge according to the second embodiment of the present invention, before the upper flange is welded to the hub.

Also, as shown in FIG. 13A, an inner circumferential surface of the reel hub 202 is provided with a small diameter portion 214 (stepped portion) at a position a step lower than the end surface of the reel hub 202. A weld boss 216 is provided projecting from a top surface of the small diameter portion 214.

A boss 204A is formed at the upper flange 204. An external diameter of the boss 204A is slightly smaller than an internal diameter of the reel hub 202, so that a gap s is formed between an inner circumferential surface of the reel hub 202 and an outer circumferential surface of the boss 204A.

Figure 13B:
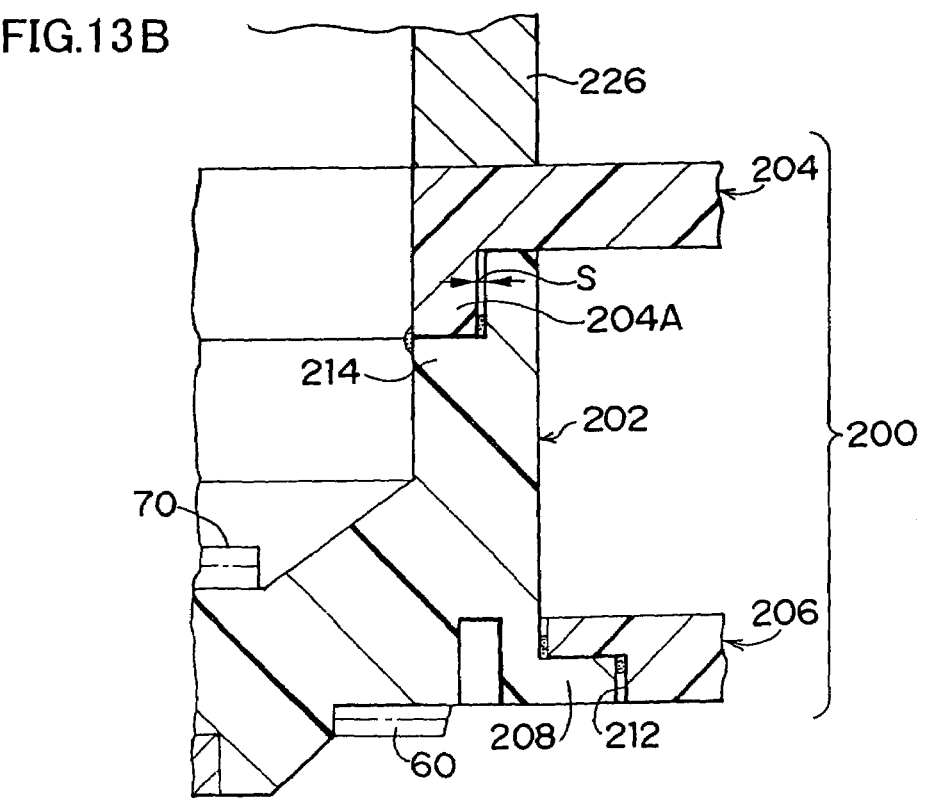
FIG. 13B is an enlarged view of the small diameter portion provided at the hub and the boss provided at the upper flange included in the reel included in the recording tape cartridge according to the second embodiment of the present invention, when the upper flange is welded to the hub.

Thus, when the reel hub 202 and the upper flange 204 are welded, as shown in FIG. 13B, residue of the fused weld boss 216 runs into the gap s (see FIG. 13A). Therefore, the residue of the welding material does not run over onto the surface of the reel hub 202. Further, by making the residue of the welding material run into the gap s formed between the inner circumferential surface of the reel hub 202 and the outer circumferential surface of the boss 204A, welding can be effected not only in the axial direction of the reel hub 202, but also in the circumferential direction thereof, thereby providing a good welding stability.

It should be noted that, although the residue of the fused weld boss 216 slightly overflows onto inner circumferential surfaces of the boss 204A and small diameter portion 214, this does not affect flatness of the upper flange 204 and roundness of the reel hub 202, and therefore is not a problem.

Next, a method for welding the upper flange 204, the lower flange 206 and the reel hub 202 is described.

First, for performing ultrasonic welding, a jig for fixing the reel hub 202 and the like, which are placed on a stage of an ultrasonic welder (not shown), and a 'horn' for transmitting vibrational energy generated by the ultrasonic welder to the upper flange 204 and the reel hub 202, and to the lower flange 206 and the reel hub 202 are necessary.

Figure 14:
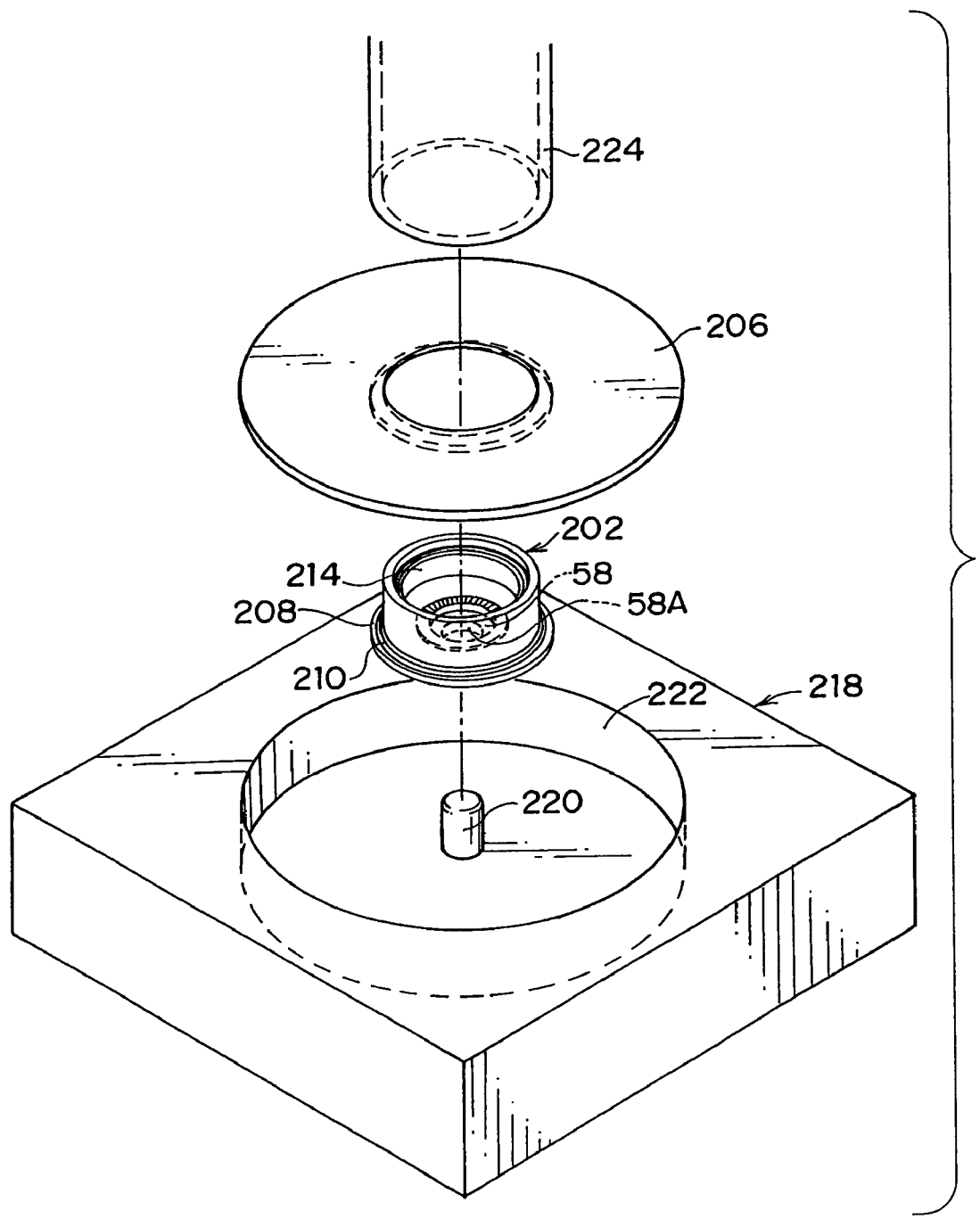
FIG. 14 is a schematic perspective view of a jig and a horn used for welding the upper flange and the hub, and the lower flange and the hub forming the reel included in the recording tape cartridge according to the second embodiment of the present invention.

As shown in FIG. 14, the jig 218 includes a hollow-cylindrical depression 222 whose internal diameter is substantially the same as external diameters of the upper flange 204 and the lower flange 206 (see FIG. 14). A cylindrical shaft 220, whose external diameter is substantially the same as the internal diameter of the hole 58A formed in the bottom wall 58 of the reel hub 202, is provided at the center of the annular depression 222.

When the upper flange 204 and the lower flange 206 are fitted in the annular depression 222 and the reel hub 202 is fitted on the shaft 220, the upper flange 204, the lower flange 206 and the reel hub 202 are coaxially aligned.

A lower flange horn 224 is substantially cylindrical, and has a size such that it can fit around the outer circumference surface of the reel hub 202 and face the collar 208. An upper flange horn 226 (see FIG. 13B) is also substantially cylindrical, and has an external diameter substantially the same as the external diameter of the reel hub 202 and an internal diameter substantially the same as the internal diameter of the small diameter portion 214 of the reel hub 202.

When welding the upper flange 204 to the reel hub 202, a load applied by the upper flange horn 226 is received by the reel hub 202, and therefore no excessive load is applied to the upper flange 204.

In this structure, the reel hub 202 is fitted on the shaft 220 of the jig 218, the lower flange 206 is fitted in the annular depression 222 and as shown in FIG. 12A, a ceiling portion 212A formed by the large diameter portion 212 of the lower flange 206 is abutted against the top of the weld boss 210 formed at the collar 208 of the reel hub 202.

In this state, the reel hub 202 and the lower flange 206 are coaxially positioned. Therefore, the axes of the lower flange 206 and the reel hub 202 are kept aligned in spite of the presence of the gaps h and t formed between the outer circumferential surfaces of the reel hub 202 and the inner circumferential surfaces of the lower flange 206.

Next, as shown in FIG. 12B, the lower flange horn 224 of the ultrasonic welder is abutted on the lower flange 206, and the vibrational energy generated by the ultrasonic welder is transmitted to the lower flange 206 via the lower flange horn 224. Thus, frictional heat is generated between the lower flange 206 and the reel hub 202, and the weld boss 210 (see FIG. 12A) is fused to weld the lower flange 206 to the reel hub 202.

Next, the upper flange 204 is welded to the reel hub 202 (see FIG. 14). The upper flange 204 is fitted in the annular depression 222 of the jig 218 shown in FIG. 14 and as shown in FIG. 13A, the end surface of the boss 204A of the upper flange 204 is abutted against the top of the weld boss 216 formed at the small diameter portion 214 of the reel hub 202, to which the lower flange 206 has already been welded.

In this state, the upper flange 204 and the reel hub 202 are coaxially positioned. Therefore, the axes of the upper flange 204, the reel hub 202 and the lower flange 206 are kept aligned in spite of the presence of the gap s formed between the inner circumferential surface of the reel hub 202 and the outer circumferential surface of the boss 204A.

Next, as shown in FIG. 13B, the upper flange horn 226 is abutted on the upper flange 204. Thus, the weld boss 216 (see FIG. 13A) is fused to weld the upper flange 204 to the reel hub 202, thereby forming the reel 200.

As described above, by welding the upper flange 204, the lower flange 206 and the reel hub 202, which are separately molded, the highly accurate reel 200 can be easily formed.

In other words, the upper flange 204, the lower flange 206 and the reel hub 202 can be separately molded. This allows selection of a suitable gating system (such as disc gates) and setting of optimal molding conditions for each of the upper flange 204, the lower flange 206 and the reel hub 202 depending on the shapes thereof. Thus, flatness of the lower flange 206 can be improved, and at the same time roundness of the reel hub 202 can also be improved.

By welding, the reel hub 202 and the lower flange 206 can be united with certainty and without backlash, as compared with the case in which the lower flange and the hub are provided with pawl portions to be fitted with each other, and can be united more simply as compared with the case in which the flange and the hub are threaded and screwed together.

It should be noted that although the upper flange 204 and the lower flange 206 are separately welded to the reel hub 202 in this embodiment, welding between the upper flange 204 and the reel hub 202, and between the reel hub 202 and the lower flange 206 may be performed simultaneously by fitting the reel hub 202, the lower flange 206 and the upper flange 204 in the annular depression 222 in this order and then abutting the upper flange horn 226 on the upper flange 204. However, in this case, slight modifications are required to a generated frequency setting of the ultrasonic welder, to the shape of the horn, and the like.

Further, although the collar 208 is extended from the outer circumferential surface of the reel hub 202 for welding to the lower flange 206 in this embodiment, the shape is not limited to the shape in this embodiment; all that is required is that the lower flange 206 can be welded to the reel hub 202 neatly.

Figure 15:
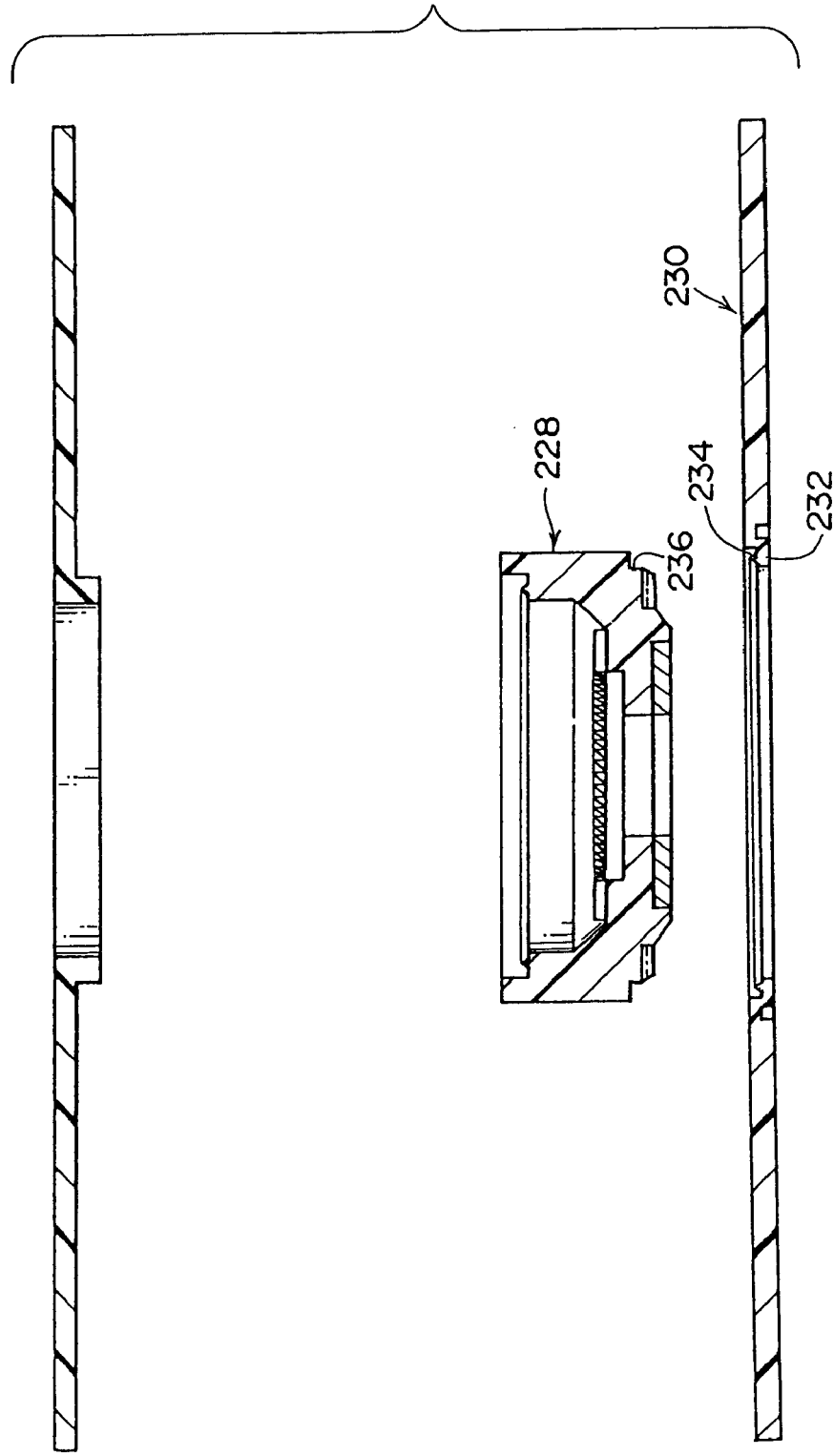
FIG. 15 is an exploded sectional view of a modification of the reel included in the recording tape cartridge according to the second embodiment of the present invention.

For example, as shown in FIGS. 15 and 16, a small diameter portion 236 is provided at an outer circumferential lower edge of a hub 228, a small diameter flange 232 is provided at a lower flange 230 extending from an inner circumferential surface thereof, and a weld boss 234 is provided projecting from the small diameter flange 232.

Figure 17A:
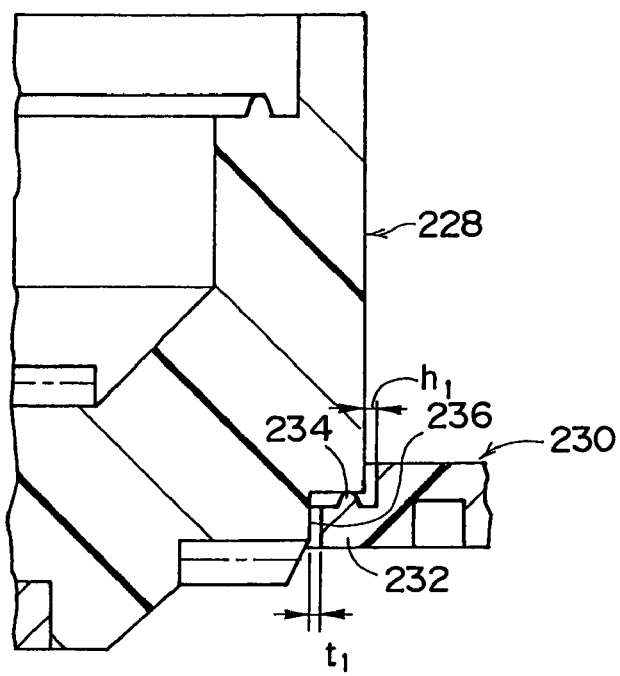
FIG. 17A is an enlarged view of the modification of the reel included in the recording tape cartridge according to the second embodiment of the present invention, before the hub is welded to the lower flange.
Figure 17B:
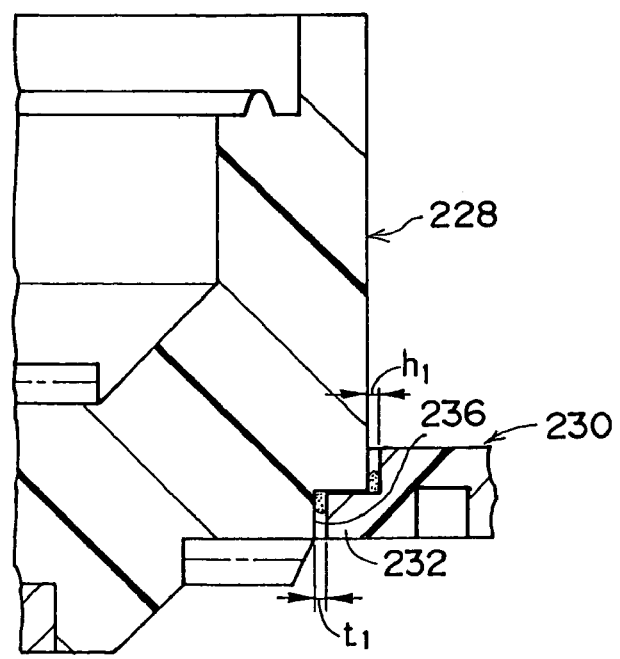
FIG. 17B is an enlarged view of the modification of the reel included in the recording tape cartridge according to the second embodiment of the present invention, when the hub is welded to the lower flange.

Further, an internal diameter $D_1$ of the lower flange 230 is slightly larger than an external diameter $D_2$ of the hub 228. When the hub 228 is fitted in the lower flange 230, a gap $h_1$ is formed between the outer circumferential surface of the hub 228 and the inner circumferential surface of the lower flange 230, as shown in FIG. 17. Also an internal diameter of the small diameter flange 232 of the lower flange 230 is slightly larger than an external diameter of the small diameter portion 236 of the hub 228, and when the hub 228 is fitted in the lower flange 230, a gap $t_1$ is formed between the small diameter portion 236 of the hub 228 and the small diameter flange 232 of the lower flange 230. Thus, when the hub 228 and the lower flange 230 are welded together, residue of the fused weld boss 234 (see FIG. 17A) runs into the gaps $h_1$ and $t_1$, as shown in FIG. 17B.

Figure 18A:
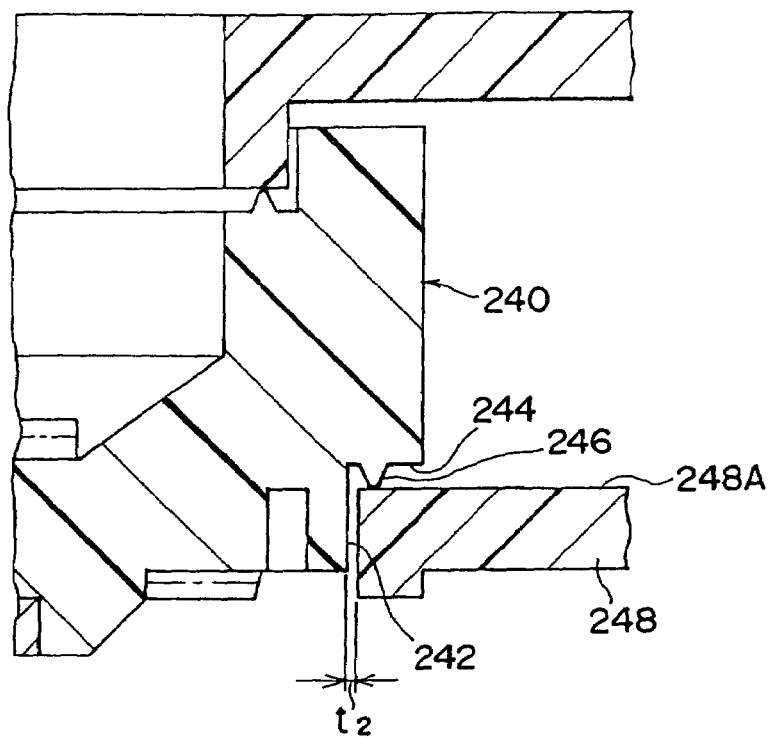
FIG. 18A is an enlarged view of another modification of the reel included in the recording tape cartridge according to the second embodiment of the present invention, before an upper flange and a lower flange are welded to a hub.
Figure 18B:
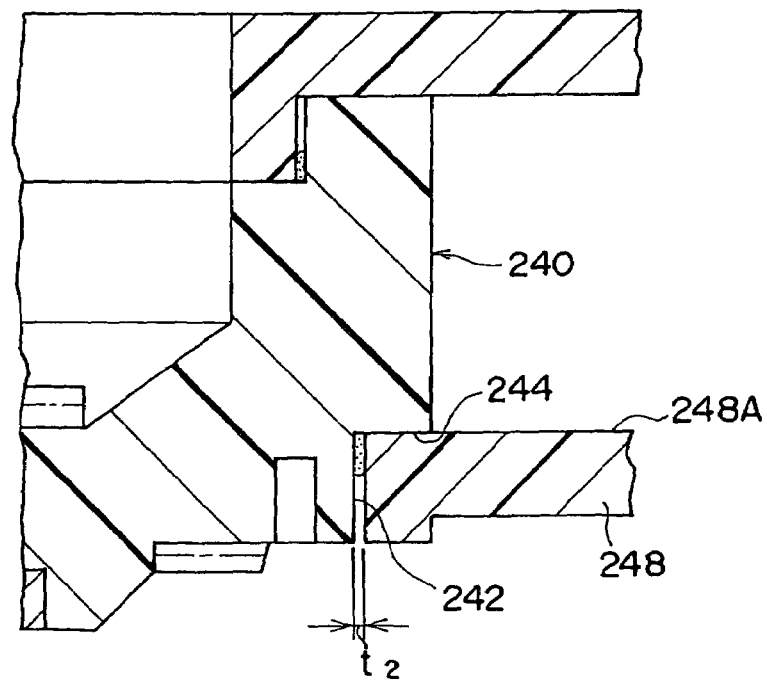
FIG. 18B is an enlarged view of the modification of the reel included in the recording tape cartridge according to the second embodiment of the present invention, when the upper flange and the lower flange are welded to the hub.

Further, as shown in FIGS. 18A and 18B, by providing a small diameter portion 242 (stepped portion) at an outer circumferential lower edge of a hub 240, providing a weld boss 246 projecting from a ceiling surface 244 formed by a small diameter portion 242, and welding a top surface 248A of a lower flange 248 thereto, so that there is no gap formed in an area of an outer circumferential surface of the hub 240, where magnetic tape will be wound, a risk of edges of the magnetic tape coming into such a gap can be eliminated.

In this structure, a gap $t_2$ is formed between the small diameter portion 242 of the hub 240 and an inner circumferential surface of the lower flange 248, so that residue of the fused weld boss 246 runs into the gap $t_2$. Accordingly, the weld boss 246 provided at the ceiling surface 244 must be disposed near the small diameter portion 242, so that the residue of the fused weld boss 246 does not overflow onto the outer circumferential surface of the hub 240.

As described above, in order to eliminate the risk of the edge of the magnetic tape coming into a gap, what is required is simply that no gap is formed in the area of the outer circumferential surface of the hub 240 where the magnetic tape is wound. Therefore, the shape is not limited to the above structure.

Figure 19:
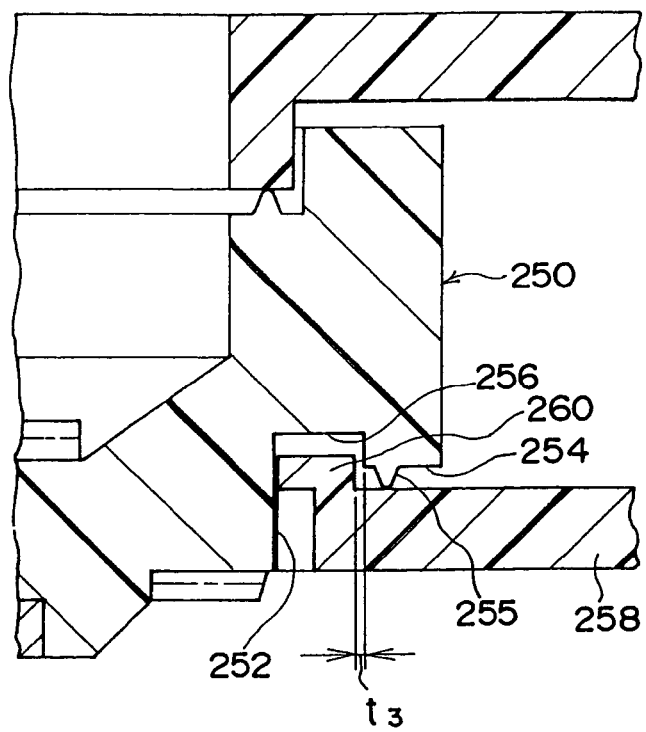
FIG. 19A is an enlarged view of yet another modification of the reel included in the recording tape cartridge according to the second embodiment of the present invention, before an upper flange and a lower flange are welded to a hub.
FIG. 19B is an enlarged view of the modification of the reel included in the recording tape cartridge according to the second embodiment of the present invention, when the upper flange and the lower flange are welded to the hub.
Figure 19:
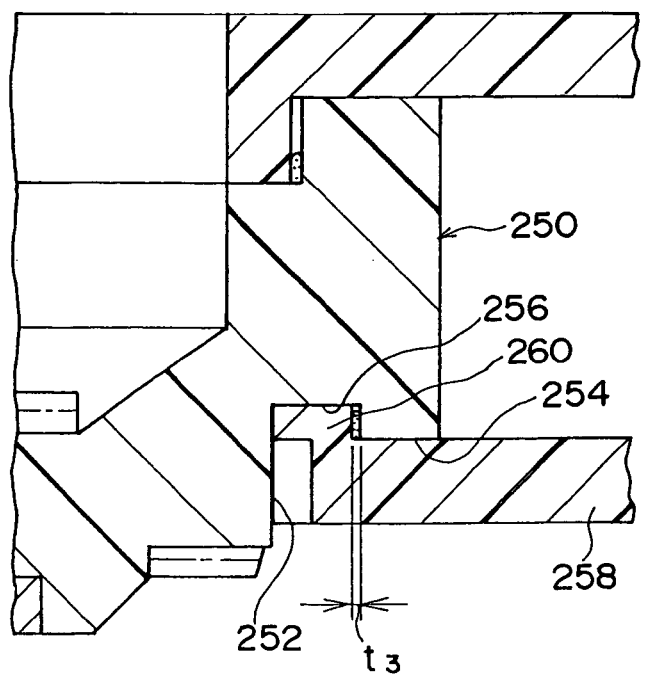

For example, as shown in FIGS. 19A and 19B, a depression 256 is provided between a small diameter portion 252 (stepped portion) provided at a hub 250 and a ceiling surface 254. A projection 260, which can be accommodated in the depression 256, is provided at a lower flange 258 so that the projection 260 is accommodated in the depression 256 when the lower flange 258 is welded to the hub 250, and a gap $t_3$ is formed between the projection 260 and the depression 256.

In order to ensure that residue of a weld boss 255 provided at the ceiling surface 254 runs into the gap $t_3$, the weld boss 255 is provided near the small diameter portion 252. Thus the residue of the weld boss 255 does not overflow onto an outer circumferential surface of the hub 250.

Next, a reel of a magnetic tape cartridge according to a third embodiment of the present invention is described. It should be noted that details of the magnetic tape cartridge according to the present embodiment are substantially the same as those of the magnetic tape cartridge according to the first embodiment, and therefore explanation thereof is omitted.

Figure 20:
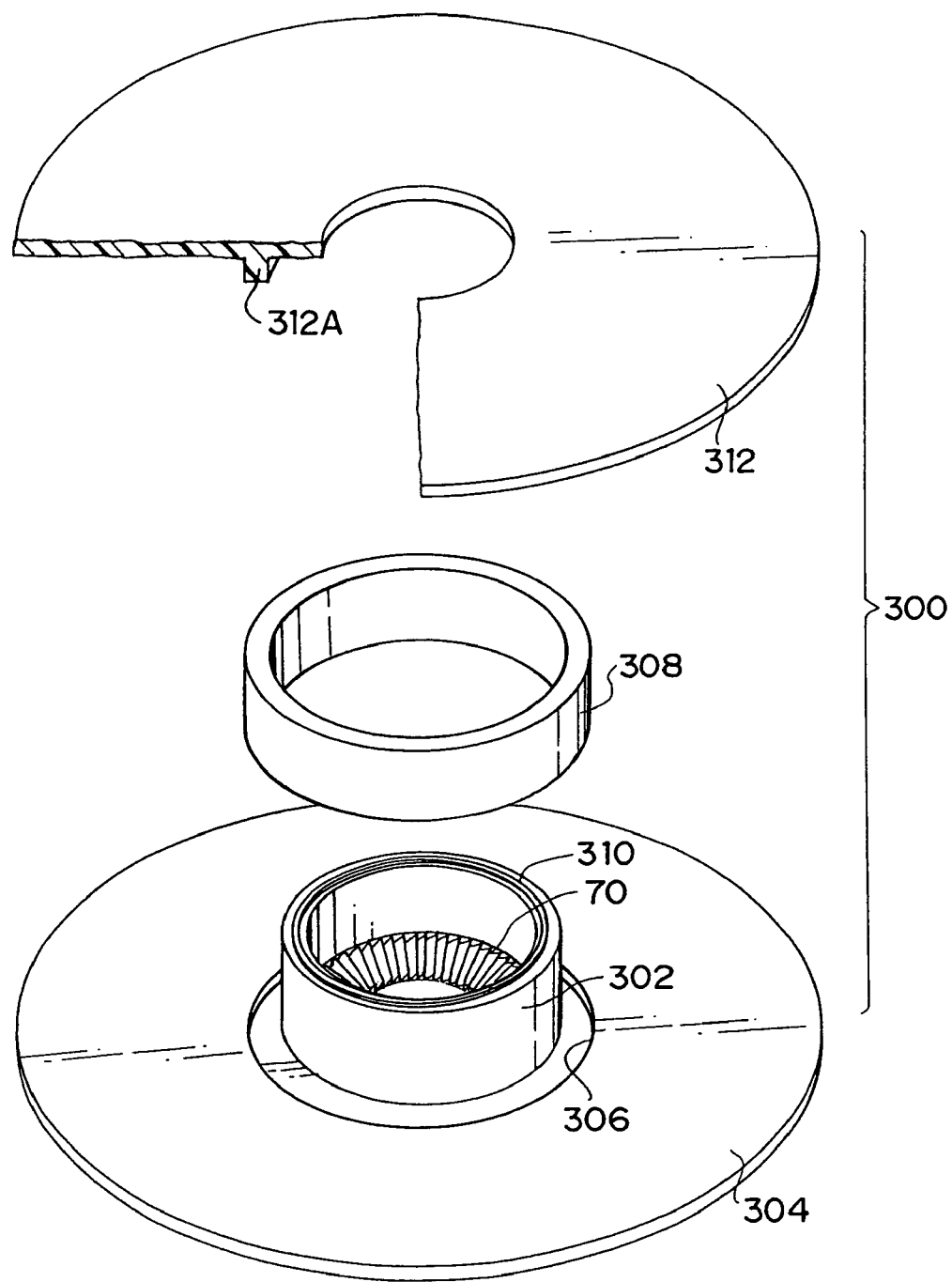
FIG. 20 is an exploded perspective view of a reel included in a recording tape cartridge according to a third embodiment of the present invention.
Figure 21:
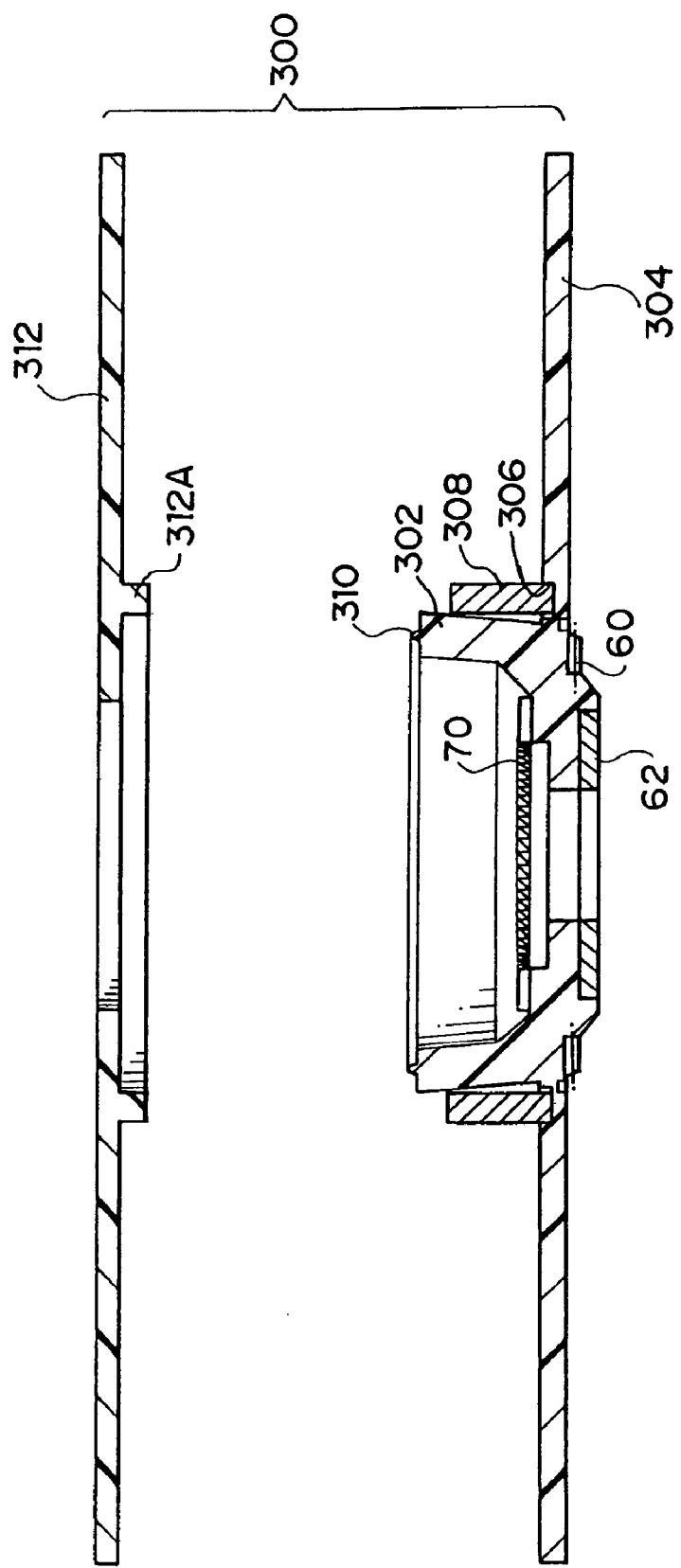
FIG. 21 is an exploded sectional view of the reel included in the recording tape cartridge according to the third embodiment of the present invention.

As shown in FIGS. 20 and 21, a reel hub 302 (core) and a lower flange 304 forming a reel 300 are integrally molded.

The lower flange 304 is provided with an annular depression 306 outside the reel hub 302. A metal sleeve 308, which serves as a hub, can be fitted in the annular depression 306 so as to sheathe the reel hub 302.

A height of the sleeve 308 is less than a height of the reel hub 302, and a tip of the reel hub 302 sticks out from the sleeve 308 when the sleeve 308 is fitted in the annular depression 306.

A weld boss 310 for ultrasonic welding having a substantially triangular sectional form is provided so as to project from an end surface of the reel hub 302. By fusing the weld boss 310 with ultrasonic waves in a state in which an upper flange 312 is placed on the top of the weld boss 310, the upper flange 312 is welded to the end surface of the reel hub 302, to form the reel 300.

A boss 312A is formed at the upper flange 312. A height of the boss 312A is equal to the difference between the height of an end surface of the sleeve 308 fitted in the annular depression 306 and the height of the end surface of the reel hub 302.

When the upper flange 312 is placed on the reel hub 302, the boss 312A faces the annular depression 306 formed at the lower flange 304, and an outer circumferential surface of the annular depression 306 is disposed in line with an outer circumferential surface of the boss 312A.

Figure 22:
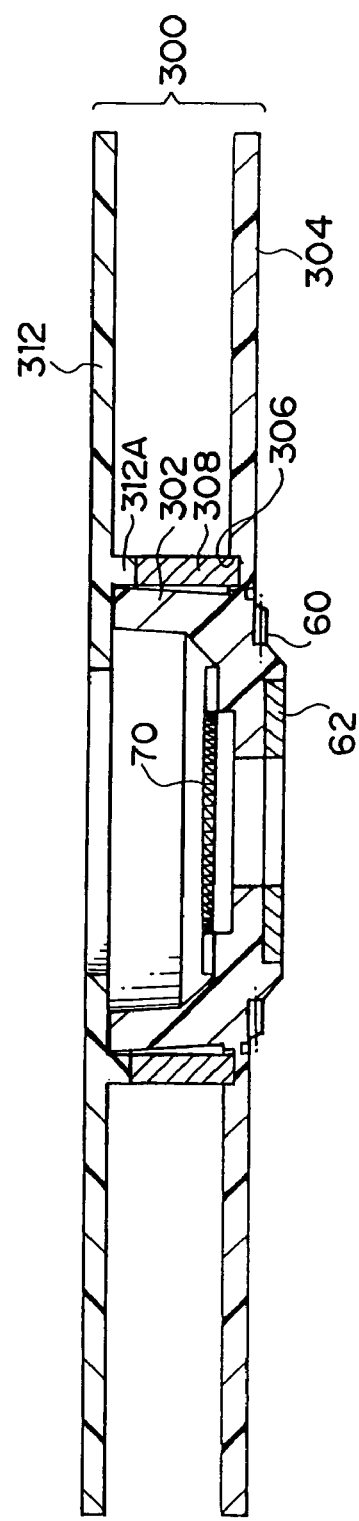
FIG. 22 is a sectional view of the reel included in the recording tape cartridge according to the third embodiment of the present invention.
Figure 23:
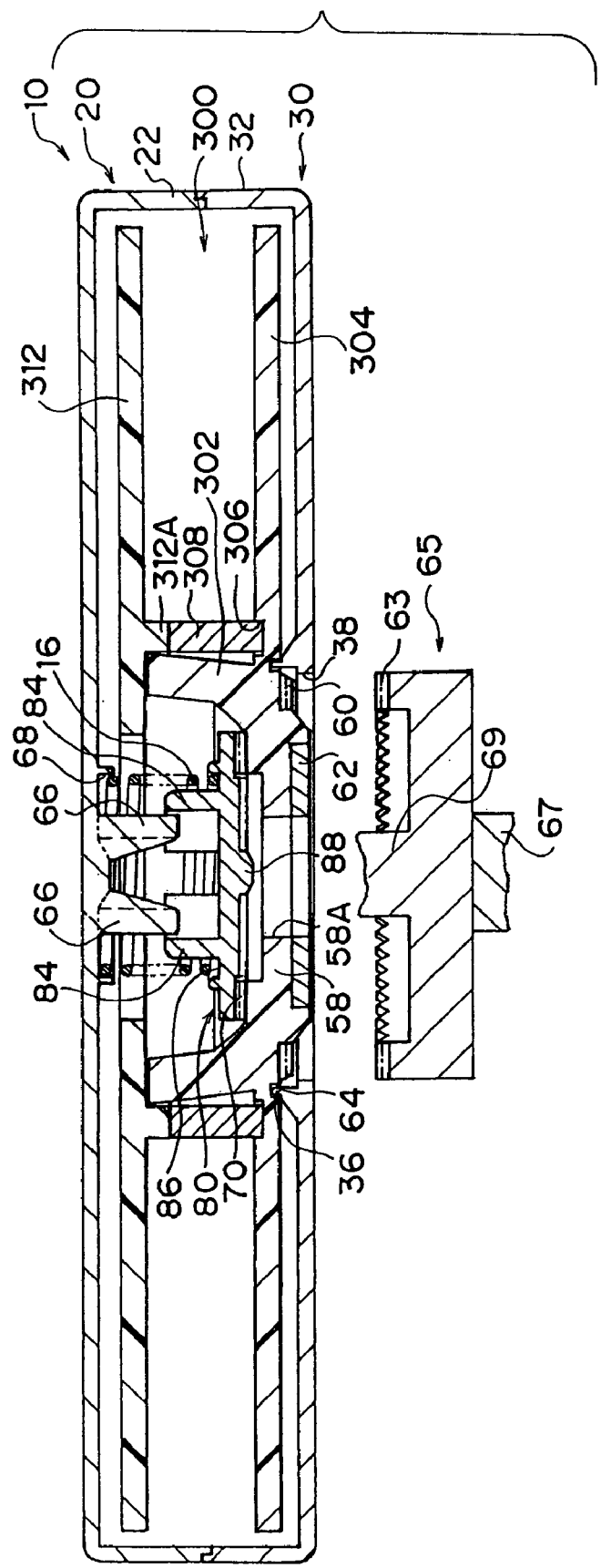
FIG. 23 is a sectional view of the recording tape cartridge according to the third embodiment of the present invention.

When the upper flange 312 is welded to the end surface of the reel hub 302 by ultrasonic welding as shown in FIGS. 22 and 23, the end surface of the boss 312A abuts on the end surface of the sleeve 308. The sleeve 308 is fixed by the annular depression 306 and the boss 312A, and the outer circumferential surface of the boss 312A and the outer circumferential surface of the sleeve 308 become substantially flush.

Because the sleeve 308 is disposed at the outer circumferential surface of the annular depression 306, a gap is formed between the inner circumferential surface of the sleeve 308 and the outer circumferential surface of the reel hub 302. However, because the sleeve 308 is fixed by the annular depression 306 and the boss 304A, the sleeve 308 does not rattle.

In the structure described above, the sleeve 308 is disposed outside the reel hub 302, and the magnetic tape 12 (see FIG. 1) is wound on the sleeve 308. Therefore, even if the reel hub 302 is caused to incline by thermal contraction after molding of the reel hub 302 and the lower flange 304, this inclination will not affect winding of the magnetic tape 12. As a result, a highly accurate hub can be obtained.

Further, thermal contraction after the molding is effected along radial directions of the reel hub 302 and the lower flange 304, and the annular depression 306 follows the thermal contraction of the reel hub 302 and the lower flange 304. By providing the annular depression 306 at the lower flange 304 on a concentric circle thereof, and fitting the sleeve 308 in the annular depression 306, the axis of the sleeve 308 is aligned with axes of the reel hub 302 and the lower flange 304. Therefore, the axis of the sleeve 308 does not deviate with respect to the lower flange 304.

Figure 26:
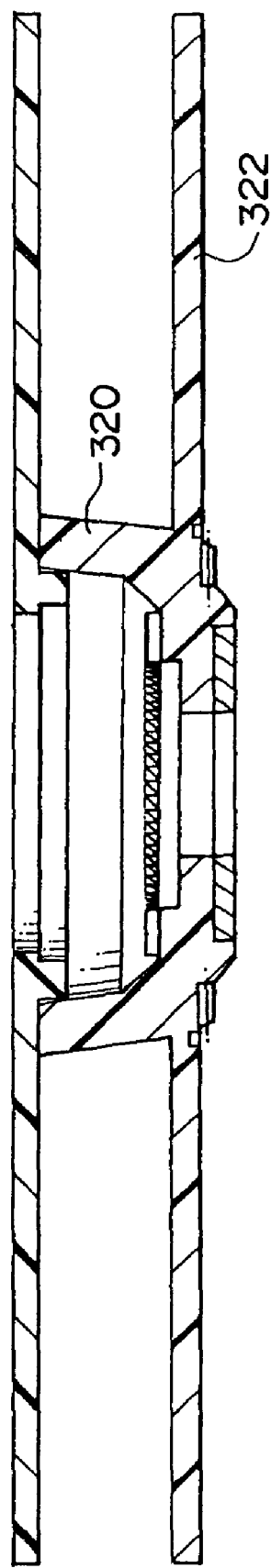
FIG. 26 is a sectional view showing a state in which a reel hub is inclined.

In a conventional structure, if a reel hub 320 is inclined by thermal contraction of the reel hub 320 and a lower flange 322 (see FIG. 26), the inclination of the reel hub 320 will affect winding of a magnetic tape, and therefore such reels have been considered defective. However, by placing the sleeve 308 outside (around) the reel hub 302, yield is improved and this leads to a cost reduction.

It should be noted that although the lower flange 304 is provided with the annular depression 306 and the sleeve 308 is fitted around the reel hub 302 and fitted in the annular depression 306 after the lower flange 304 and the reel hub 302 are molded, other structures can also be used, as long as they can provide a highly accurate hub.

For example, by inserting the metal sleeve 308 in a metal mold for molding the lower flange 304 and the reel hub 302, these may be integrally molded such that the sleeve 308 is positioned outside the reel hub 302. Since the metal sleeve 308 has a lower coefficient of linear expansion than synthetic resins, it hardly deforms at all compared with synthetic resins. Therefore, a highly accurate hub can be obtained.

However, the sleeve is not limited to the metal sleeve 308, and may be made of any material whose melting temperature is higher than that of the core and the lower flange, and which does not melt when the core and the lower flange are molded. Therefore, the sleeve may be made of a synthetic resin.

Figure 24:
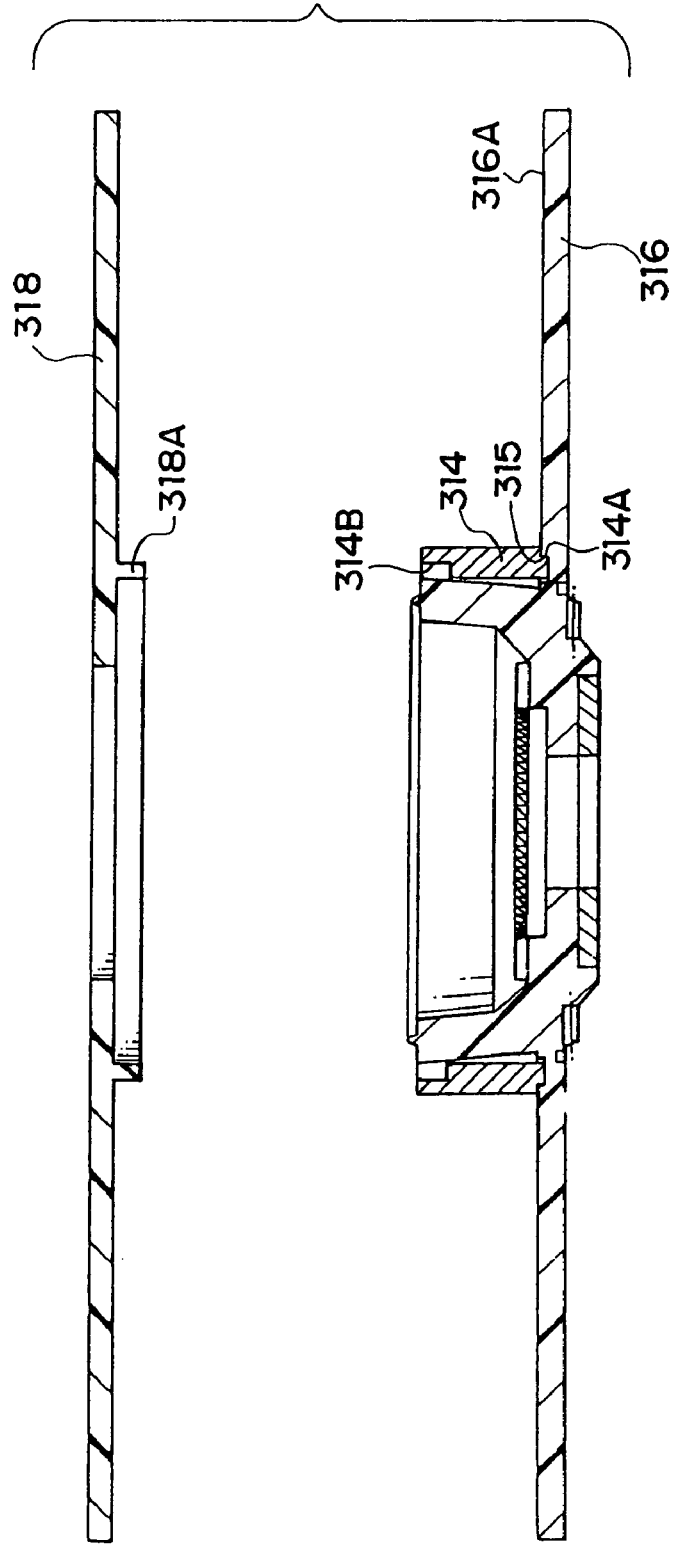
FIG. 24 is an exploded sectional view of a modification of the reel included in the recording tape cartridge according to the third embodiment of the present invention.
Figure 25:
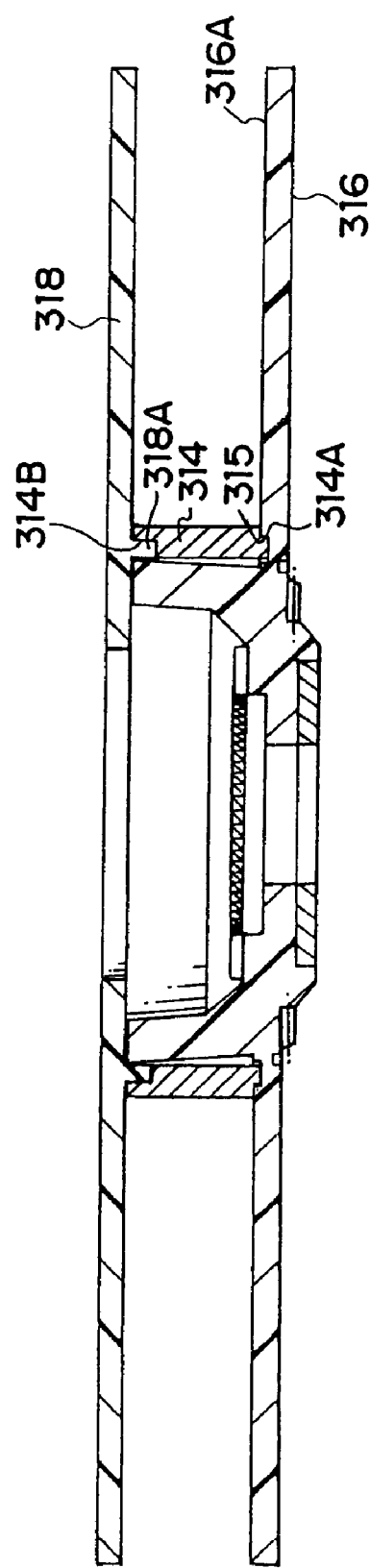
FIG. 25 is a sectional view of the modification of the reel included in the recording tape cartridge according to the third embodiment of the present invention.

Further, as shown in FIGS. 24 and 25, by providing a small diameter portion 314A at one end side of an outer circumference of a sleeve 314, fitting the small diameter portion 314A in an annular depression 315 of a lower flange 316, and abutting a ceiling portion between the outer circumferential surface of the sleeve 314 and the small diameter portion 314A on the lower flange 316, the risk of the edge of the magnetic tape 12 (see FIG. 1) coming into a gap formed between the outer circumferential surface of the sleeve 314 and the annular depression 315 can be eliminated.

Further, a small diameter portion 314B may be provided at an inner circumference at the other end side of the sleeve 314 and a boss 318A of an upper flange 318 may be positioned at the inner circumference side of the sleeve 314. In this structure, the magnetic tape 12 is wound only on the sleeve 314. Therefore, even if the size of the boss 318A of the upper flange 318 is irregular, winding of the magnetic tape 12 will not be affected.

Next, a magnetic tape cartridge according to a fourth embodiment of the present invention is described. It should be noted that details of the magnetic tape cartridge according to the present embodiment are substantially the same as those of the magnetic tape cartridge according to the first embodiment, and therefore explanation thereof is omitted.

Figure 27:
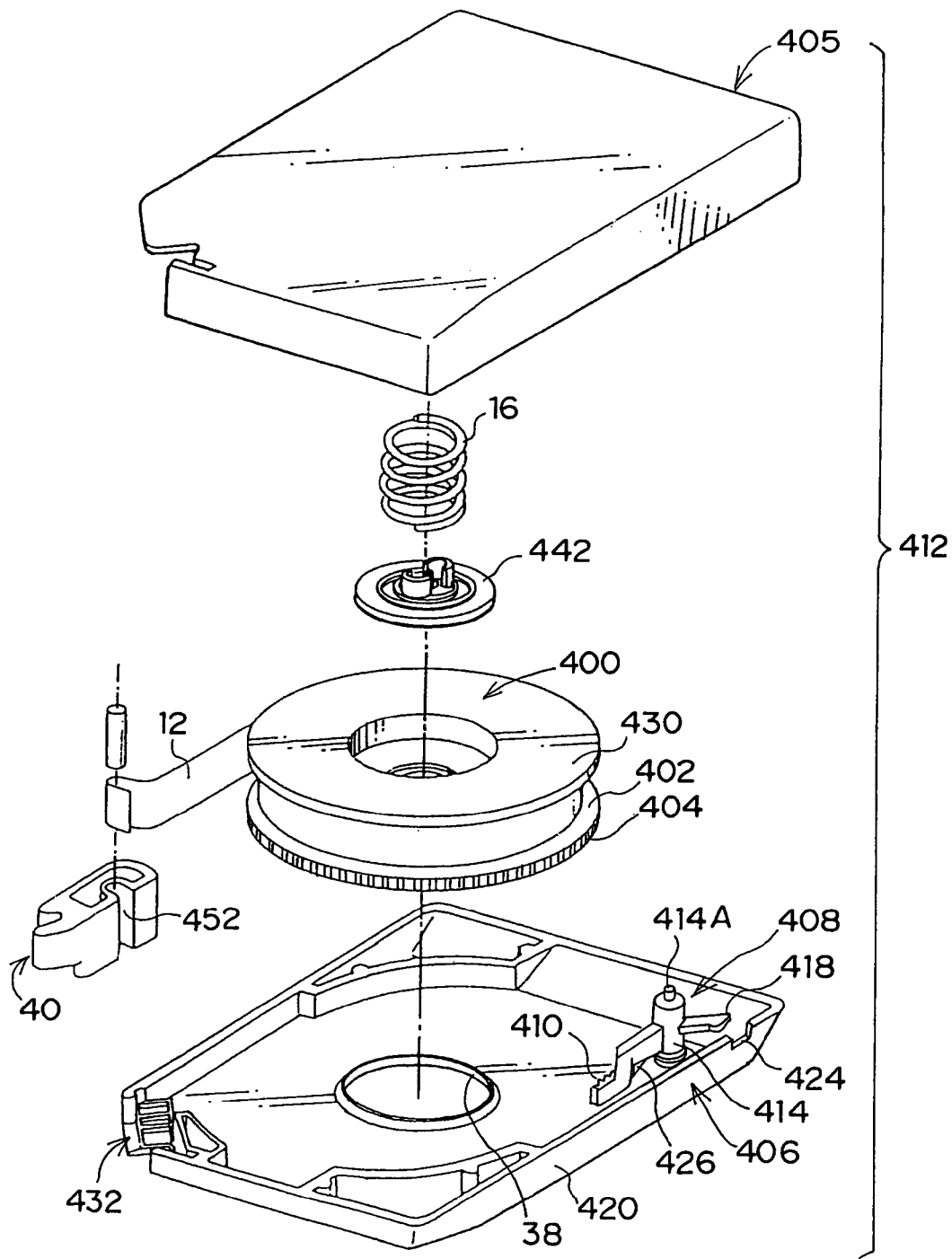
FIG. 27 is an exploded perspective view of a recording tape cartridge according to a fourth embodiment of the present invention.
Figure 28:
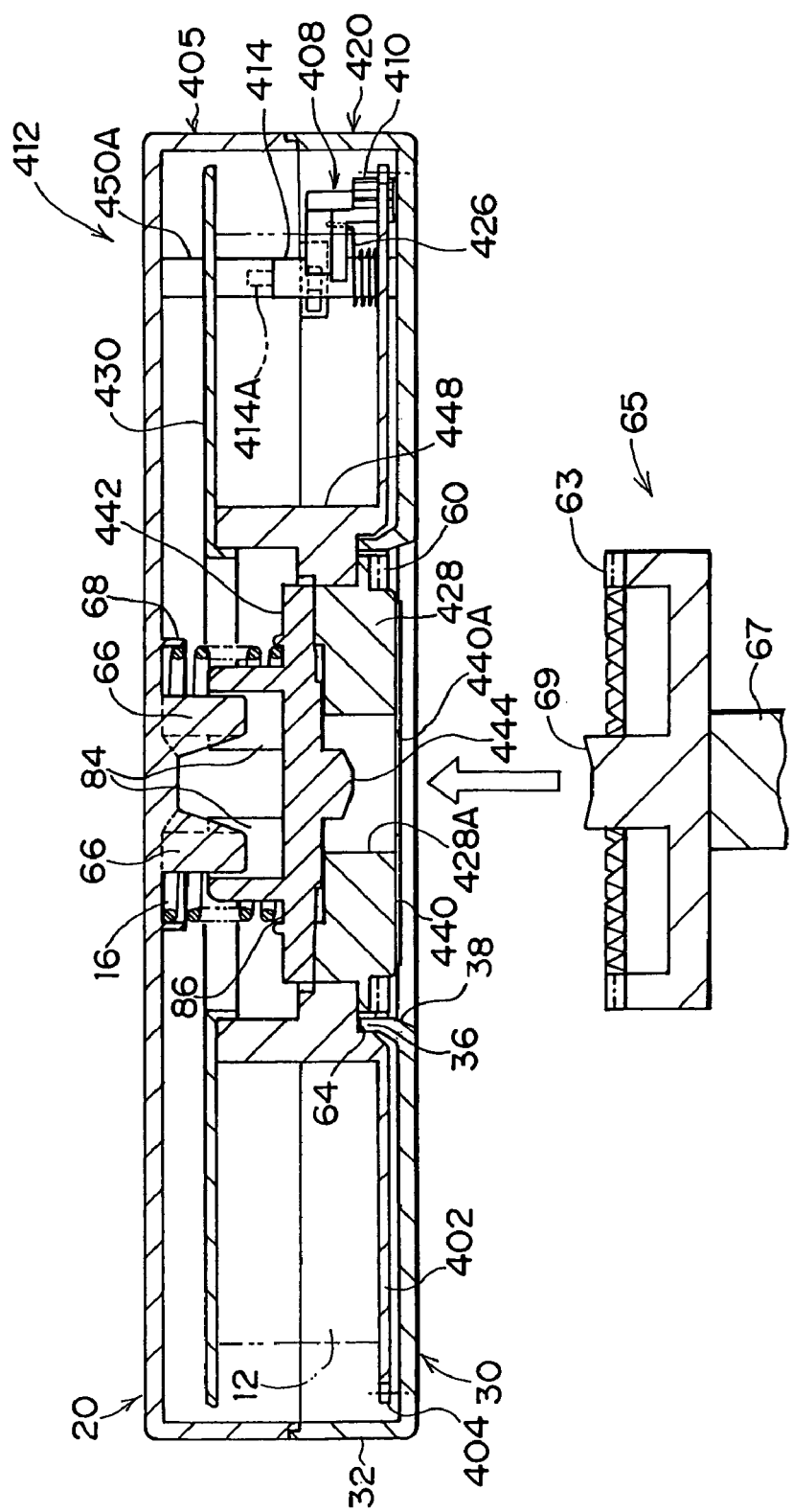
FIG. 28 is a sectional view of the recording tape cartridge according to the fourth embodiment of the present invention and the drive-side driving device.

As shown in FIG. 1, in the magnetic tape cartridge according to the first embodiment of the present invention, the annular reel gear 70 formed at the top surface side of the bottom wall 58 of the reel hub 56 can mesh with the braking gear 82 provided at the bottom surface outer circumferential portion of the braking member 80, which can be accommodated in the reel hub 56. When the magnetic tape cartridge 10 is not in use, the braking gear 82 of the braking member 80 meshes with the reel gear 70 to prevent rotation of the reel 50. However, in the present embodiment, shown in FIGS. 27 and 28, a braking reel gear 404 is provided at an outer circumferential portion of a lower flange 402 so as to mesh with a braking gear 410 of a braking member 408 provided in the vicinity of at least one corner within a lower case 406.

The braking member 408 is provided for preventing rotation of a reel 400 when a magnetic tape cartridge 412 is not in use. The braking member 408 has a substantial L shape viewed from above. The braking member 408 is supported rotatably with a lower portion of a supporting shaft 414 at the middle of the braking member 408 being fitted, with play, around a protrusion (not shown) provided at the lower case 406, and a substantially cylindrical protrusion 414A provided at an upper portion of the supporting shaft 414 being fitted, with play, in a boss 405A provided projecting from an inner surface of an upper case 405.

The braking gear 410 is provided at one end of the braking member 408, and an engaging portion 418 is provided at the other end thereof. The engaging portion 418 faces an opening 424 provided in a peripheral wall 420 of the lower case 406. The braking gear 410 is urged against the reel gear 404 by a torsion spring 426.

Thus, the braking gear 410 engages with the reel gear 404, thereby preventing rotation of the reel 400. By providing the reel gear 404 at the outer circumferential portion of the lower flange 402, and engaging the braking gear 410 with the reel gear 404 to effect braking (to prevent rotation), required braking force becomes small and pitch of the reel gear 404 and the braking gear 410 can be increased.

Specifically, the pitch of the reel gear 404 and the braking gear 410 is usually in a range from 1 to 3.5 mm, and more usually from 2.5 to 3 mm. This pitch makes the reel gear 404 and the braking gear 410 resistant to breakage, and unintended rotation of the reel 400 can be assuredly prevented preferably.

Since the reel gear 404 is provided at the outer circumferential portion of the lower flange 402, and the braking gear 410 engages with the reel gear 404 to effect braking, there is no need to provide the reel gear 70 (see FIG. 1) at a top surface of a bottom wall 428 of the reel 400. Therefore, molding accuracy of the reel 400 can be improved.

When the magnetic tape cartridge 412 is mounted in the drive 65, an engaging member (not shown) provided at the drive 65 enters the magnetic tape cartridge 412 through the opening 424 and pushes the engaging portion 418 of the braking member 408, thereby rotating the braking gear 410 on the supporting shaft 414, against the urging force of the torsion spring 426, in a direction in which meshing between the braking gear 410 and the reel gear 404 is released.

Next, operation of the magnetic tape cartridge 412 having the above-described structure is explained.

When the magnetic tape cartridge 412 is not in use, unintended rotation of the reel 400 is prevented by the braking member 408. Namely, the braking gear 410 urged by the torsion spring 426 meshes with the reel gear 404 formed at the lower flange 402 of the reel 400 to prevent unintended rotation of the reel 400.

On the other hand, when the magnetic tape cartridge 412 is to be used, it is mounted in a bucket (not shown) of the drive 65. When the magnetic tape cartridge 412 is mounted in the bucket, the bucket moves downward and a rotation shaft 67 of the drive 65 moves relatively closer to the opening 38.

Then, the substantially cylindrical mesh-release pin 69 provided at the center of the distal end of the rotating shaft 67 enters the magnetic tape cartridge 412 through a hole 440A in a reel plate 440, abuts on a projection 444 of a spring seat 442, and via the projection 444, pushes the spring seat 442 upward against the urging force of the spring 16. The magnet (not shown) disposed at the distal end of the rotating shaft 67 except at the mesh-release pin 69 attracts and holds the reel plate 440, and the reel gear 60 is meshed with the driving gear 63 while the center of rotation is preferably secured.

At this time, the engaging member (not shown) enters the magnetic tape cartridge 412 through the opening 424 and pushes the engaging portion 418 to rotate the braking gear 410 against the urging force of the torsion spring 426 to a non-meshing position, thereby releasing the meshing between the braking gear 410 and the reel gear 404. Thus, rotation of the reel 400 is permitted.

Thereafter, the pulling pin (not shown) provided at the drive 65 is engaged with a depression 452 of the leader block 40 attached at the end of the magnetic tape 12, and pulls the leader block 40 out of the magnetic tape cartridge 412.

Then, the leader block 40 is fitted to a reel hub of a winding reel (not shown) at the drive 65 such that the magnetic tape 12 can be wound on the winding reel. The reel 400 and the winding reel are driven to rotate synchronously to wind the magnetic tape 12 on the winding reel sequentially, and at this time data is written on or read from the magnetic tape 12.

When the magnetic tape 12 has been completely wound up on the winding reel, the reel 400 and the winding reel are driven to rotate in a reverse direction, to wind the magnetic tape 12 on the reel 400. When the magnetic tape 12 has been completely wound up on the reel 400, the leader block 40 is pulled out of the reel hub and is locked at an opening 432 of the magnetic tape cartridge 412.

Then, the magnetic force of the magnet is turned off, releasing the attraction between the magnet and the reel plate 440, the rotating shaft 67 is moved downward to release the meshing between the reel gear 60 and the driving gear 63, and the mesh-release pin 69 is pulled out from the hole 440A in the reel plate 440.

Thus, the spring seat 442 is pushed downward by the urging force of the spring 16. Also the engaging member is retracted from the opening 424 formed in the lower case 406, releasing the pressure applied onto the engaging portion 418. Thus, the braking gear 410 is meshed with the reel gear 404 by the urging force of the torsion spring 426 to prevent unintended rotation of the reel 400, as described above.

It should be noted that, although in this embodiment the reel gear 404 is provided at the outer circumferential portion of the lower flange 402 and is engaged with the braking gear 410, a braking reel gear may be provided at the upper flange 430 and for engaging with a braking member.

In the invention exemplified by the first embodiment, by forming the hub so that sectional forms thereof taken radially from the axis thereof are the same, flowing states of the molding material at the respective cross-section positions can be made the same at the respective cross-sectional positions. Therefore, the flowing state of the molding material does not differ with circumferential direction position.

Often in the invention, by joining the outer circumference of the inserted metal plate to the end of the hub by an annular joining device, sectional forms of the hub taken radially from the axis can be made the same as each other. Further, since there is no need to provide holes or the like in the metal plate, as there has been in prior arts, variations in the pressure of the molding material flowing over the metal plate are small. Therefore, residual stress can be reduced, thereby improving accuracy of the hub and flatness of the flange. Furthermore, by joining at the outer circumference of the metal plate, the internal dimensions of the portion joining the metal plate are increased compared with the case in which the metal plate is provided with holes. This means air is removed easily and is less likely to be retained. Thus, no wrinkles are created on the hub and the flange.

Often in the invention, the joining portion is formed as an annular pawl portion. Therefore, the metal plate is prevented from detaching. In the invention, the metal plate can be firmly fixed to the hub. Also, the metal plate can be fixed within the metal mold with certainty.

In the invention exemplified by the second embodiment, the hub and the flange are separately molded. This allows selection of a suitable gating system (e.g., disc gates) and setting of optimal molding conditions for each shape. Therefore, compared with the case in which the hub and the flange are integrally molded, variations in pressure at the hub can be reduced and flatness of the flange can be improved. Further, roundness of the hub can be improved together with the improvement in the flatness of the flange. Moreover, by welding, the hub and the flange can be united with certainty and without backlash, compared with the case in which the flange and the hub are provided with pawl portions for fitting to each other, and can be united more simply compared with the case in which the flange and the hub are threaded and screwed together.

Often in the invention, by providing a first weld boss and a second weld boss projecting from the welding surfaces, the first weld boss and the second weld boss fuse to weld the flanges to the hub when frictional heat is generated between the flanges and the hub by vibrational energy of an ultrasonic welder. Therefore, compared with the case in which no weld boss is provided, these parts can be welded together more firmly.

Often in the invention, by forming a gap between the inner circumferential surface of the flange and the outer circumferential surface of the collar and the hub, and making residue from the welding surface run into the gap, the residue of the welding can be prevented from running onto the surface of the flange. In the invention, a gap may be formed between the wall surface of the stepped portion and the outer circumferential surface of a boss provided at the inner circumferential portion of the flange, and the residue of the second weld boss made to run into the gap there. Also, the edges of the recording tape can be prevented from entering such gaps.

In the invention exemplified by the third embodiment, the hub is placed outside the core and the recording tape is wound on the hub. Therefore, even if the core is inclined due to thermal contraction after molding of the core and the lower flange, the inclination does not affect the winding of the recording tape, and a highly accurate hub can be obtained as a result.

Often in the invention, during the thermal contraction after the molding, the thermal contraction is effected along the radial directions of the core and the lower flange. Therefore, an annular depression follows the thermal contraction of the core and the lower flange. By providing the annular depression at the lower flange on a concentric circle thereof, and fitting a sleeve of the hub in the annular depression, the axis of the sleeve is aligned with axes of the core and the lower flange. Therefore, the axis of the sleeve does not deviate with respect to the lower flange.

Often in the invention, a shoulder portion between a small diameter portion and a large diameter portion abuts on the lower flange. Therefore, even if a gap is formed between the small diameter portion and the annular depression, the recording tape does not come into the gap. More usually in the invention, a labor for attaching the sleeve after the molding of the core and the lower flange can be saved. Therefore, production processes can be reduced, thereby reducing production costs.

Often in the invention, since a metal has a lower coefficient of linear expansion than synthetic resins and hardly deforms, use of the metal sleeve provides a highly accurate hub. More usually in the invention, the recording tape 12 is wound only on the sleeve. Therefore, even if the size is irregular at engaging portion which engages with the sleeve at the upper flange or the lower flange, this does not affect the winding of the recording tape.

In the invention exemplified by the fourth embodiment, by providing a braking gear at the outer circumference of the flange to effect braking, unintended rotation of the reel when the recording tape cartridge is not in use can be prevented with certainty. Further, compared with the case in which the braking gear is provided at the core side of the flange, the required braking force is smaller and the pitch of the braking gear can be increased. Therefore, failures such as breakage of the braking gear are not caused. Moreover, since the braking gear is not provided at the core side of the flange, molding accuracy of the reel can be improved.

Often in the invention, since a braking member urged by an urging device meshed with the braking gear when a driving gear is not meshed with a rotation gear, the reel cannot rotate in this state. When the driving gear meshes with the rotation gear, the braking member can be pushed against the urging force of the urging device and the engagement between the braking member and the braking gear released. Thereafter, driving force from the driving gear is transmitted to the reel rotation gear to rotate the reel. Usually in the invention, the braking gear does not easily break.

What is claimed is:

1. A recording tape cartridge for rotatably accommodating a reel on which a recording tape is wound for use with a drive, the cartridge comprising:
    a reel, the reel including a hub and a flange,
        the hub including,
            at an end of the hub, a substantially annular reel rotation gear, and,
            at an inner side of the reel rotation gear, a plate which is attractable to a magnetic portion of a drive for playing the recording tape, and
            at an inner side of the plate, a hole configured to accept a projection, and configured to accept a release pin of a rotating shaft of the drive, and
        the flange including, at an outer circumference thereof, a braking gear;
    a case accommodating the reel and including a braking member movable between positions engaged and disengaged with the braking gear, and
    a spring seat disposed between the reel and the case, the projection being disposed on the spring seat.

2. The recording tape cartridge according to claim 1, further comprising an urging device for urging the braking member wherein, when a driving gear of the drive for playing the recording tape meshes with the reel rotation gear, the braking member is pushed to the position disengaged from the braking gear.

3. The recording tape cartridge according to claim 1, wherein the braking gear comprises a pitch of from 1 mm to 3.5 mm.

4. The recording tape cartridge according to claim 1,
    wherein the reel includes an upper flange and a lower flange, the braking gear being disposed on the lower flange;
    wherein the upper flange is fixably coupled to the hub; and
    wherein the lower flange and the reel are comprised of a single piece.

* * * * *